(12) United States Patent
Stark

(10) Patent No.: US 11,282,321 B2
(45) Date of Patent: Mar. 22, 2022

(54) OPTICAL STORAGE PHOSPHOR, METHOD FOR CHECKING AN AUTHENTICITY FEATURE, DEVICE FOR CARRYING OUT A METHOD, AUTHENTICITY FEATURE AND VALUE DOCUMENT

(71) Applicant: GIESECKE+DEVRIENT CURRENCY TECHNOLOGY GMBH, Munich (DE)

(72) Inventor: Martin Stark, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 61 days.

(21) Appl. No.: 16/643,296

(22) PCT Filed: Sep. 20, 2018

(86) PCT No.: PCT/EP2018/000440
§ 371 (c)(1),
(2) Date: Feb. 28, 2020

(87) PCT Pub. No.: WO2019/057329
PCT Pub. Date: Mar. 28, 2019

(65) Prior Publication Data
US 2020/0211311 A1 Jul. 2, 2020

(30) Foreign Application Priority Data

Sep. 21, 2017 (DE) ...................... 10 2017 008 863.3

(51) Int. Cl.
*G07D 7/1205* (2016.01)
*B42D 25/373* (2014.01)
(Continued)

(52) U.S. Cl.
CPC ......... *G07D 7/1205* (2017.05); *B42D 25/373* (2014.10); *C09K 11/7774* (2013.01);
(Continued)

(58) Field of Classification Search
None
See application file for complete search history.

(56) References Cited

U.S. PATENT DOCUMENTS 4,387,112 A 6/1983 Blach
6,211,526 B1 4/2001 Huston et al.
(Continued)

FOREIGN PATENT DOCUMENTS

DE 3121484 A1 4/1982
DE 10113267 A1 9/2002
(Continued)

OTHER PUBLICATIONS

European Office Action from corresponding EP Application No. EP18781960.2, dated Feb. 16, 2021.
(Continued)

*Primary Examiner* — Edwin C Gunberg
(74) *Attorney, Agent, or Firm* — Workman Nydegger

(57) ABSTRACT

An optical storage phosphor, a method for checking an authenticity feature, and an apparatus for carrying out a method, relate to an authenticity feature and to a value document. An inorganic optical storage phosphor is provided having a garnet structure and predetermined composition.

21 Claims, 8 Drawing Sheets

(51) Int. Cl.
  *C09K 11/77* (2006.01)
  *G01N 21/64* (2006.01)
  *G07D 7/121* (2016.01)

(52) U.S. Cl.
  CPC ...... *C09K 11/7777* (2013.01); *C09K 11/7794* (2013.01); *G01N 21/64* (2013.01); *G07D 7/121* (2013.01)

(56) References Cited

U.S. PATENT DOCUMENTS

| | | | |
|---|---|---|---|
| 6,315,923 B1 * | 11/2001 | Devenney | C09K 11/7769 250/483.1 |
| 6,841,092 B2 | 1/2005 | Paeschke et al. | |
| 7,648,648 B2 | 1/2010 | Bley et al. | |
| 7,906,201 B2 | 3/2011 | Schwenk et al. | |
| 8,472,025 B2 | 6/2013 | Reinhard et al. | |
| 8,616,584 B2 | 12/2013 | Scholz et al. | |
| 9,327,542 B2 | 5/2016 | Kecht et al. | |
| 9,776,450 B2 | 10/2017 | Giering et al. | |
| 2002/0130304 A1 | 9/2002 | Paeschke et al. | |
| 2005/0205846 A1 | 9/2005 | Bley et al. | |
| 2006/0006366 A1 | 1/2006 | Abramov et al. | |
| 2007/0257482 A1 | 11/2007 | Schwenk et al. | |
| 2008/0067919 A1 | 3/2008 | Wang et al. | |
| 2009/0051158 A1 | 2/2009 | Scholz et al. | |
| 2011/0273717 A1 | 11/2011 | Reinhard et al. | |
| 2013/0182241 A1 * | 7/2013 | Lawandy | G01N 21/643 356/51 |
| 2015/0021485 A1 | 1/2015 | Hayashi et al. | |
| 2015/0276601 A1 | 10/2015 | Giering et al. | |
| 2015/0328915 A1 | 11/2015 | Kecht et al. | |
| 2015/0353822 A1 * | 12/2015 | Tyagi | G01T 1/2023 250/362 |
| 2016/0017223 A1 | 1/2016 | Tanaka et al. | |
| 2019/0164373 A1 | 5/2019 | Stark | |
| 2019/0299698 A1 | 10/2019 | Stark | |

FOREIGN PATENT DOCUMENTS

| | | |
|---|---|---|
| DE | 10346631 A1 | 5/2005 |
| DE | 102005033598 A1 | 1/2007 |
| DE | 102009005171 A1 | 7/2010 |
| DE | 102011010756 A1 | 3/2012 |
| DE | 102012013244 A1 | 1/2014 |
| DE | 102012019247 A1 | 4/2014 |
| DE | 112014000521 T5 | 10/2015 |
| DE | 102016007063 A1 | 12/2017 |
| DE | 102016007066 A1 | 12/2017 |
| DE | 102016007099 A1 | 12/2017 |
| EP | 1316924 A1 | 6/2003 |
| EP | 1478715 B1 | 3/2011 |
| WO | 03014258 A1 | 2/2003 |
| WO | 2005010507 A2 | 2/2005 |
| WO | 2009006634 A1 | 1/2009 |
| WO | 2010064956 A1 | 6/2010 |
| WO | 2011020603 A1 | 2/2011 |
| WO | 2017059832 A1 | 4/2017 |

OTHER PUBLICATIONS

Holsa, "Persistent Luminescence Beats the Afterglow: 400 Years of Persistent Luminescence," The Electrochemical Society Interface, Winter 2009, pp. 42-45.
"Phosphorescence," IUPAC Compendium of Chemical Technology, Gold Book, Aug. 23, 2017, p. 40569.
Xu et al., "Toward Tunable and Bright Deep-Red Persistent Luminescence of Cr3+ in Garnets," Journal of the American Ceramic Society, vol. 100, No. 9, May 2017, pp. 4033-4044.
Asami et al.,"Trap Depth and Color Variation of Ce3+ −Cr3+ co-doped Gd3(Al,Ga)5O12 Garnet Persistent Phosphors," Optical Materials, Elsevier B.V., vol. 62, Oct. 2016, pp. 171-175.
Kurosawa et al., "Luminescent Properties of Gd3(Al,Ga)5O12 Crystal Co-Doped with Ce and M4+," Journal of Physics: Conference Series, vol. 619, No. 1, Jun. 2015, 4 pages.
Xu et al., "Ultraviolet-blue Electroluminescence from Gd3Ga5O12:Ag," Applied Physics Letters, vol. 77, No. 5, American Institute of Phyics, Jul. 31, 2000, pp. 672-674.
Yoshino et al., "Li+, Na+, and K+ Co-Doping Effects on Scintillation Properties of Ce: Gd3Ga3Al2O12 Single Crystals," Journal of Crystal Growth, Elsevier B.V, vol. 491, 2018, pp. 1-5.
Luo et al., "Effect of Yb3+ on the Crystal Structural Modification and Photoluminescence Properties of GGAG:Ce3+," American Chemical Society, vol. 55, 2016, pp. 3040-3046.
International Search Report and Written Opinion from PCT Application No. PCT/EP2018/000440, dated Nov. 13, 2018.
German Search Report from German Application No. DE 102017008868.3, dated Jul. 10, 2018.

* cited by examiner

Fig. 5
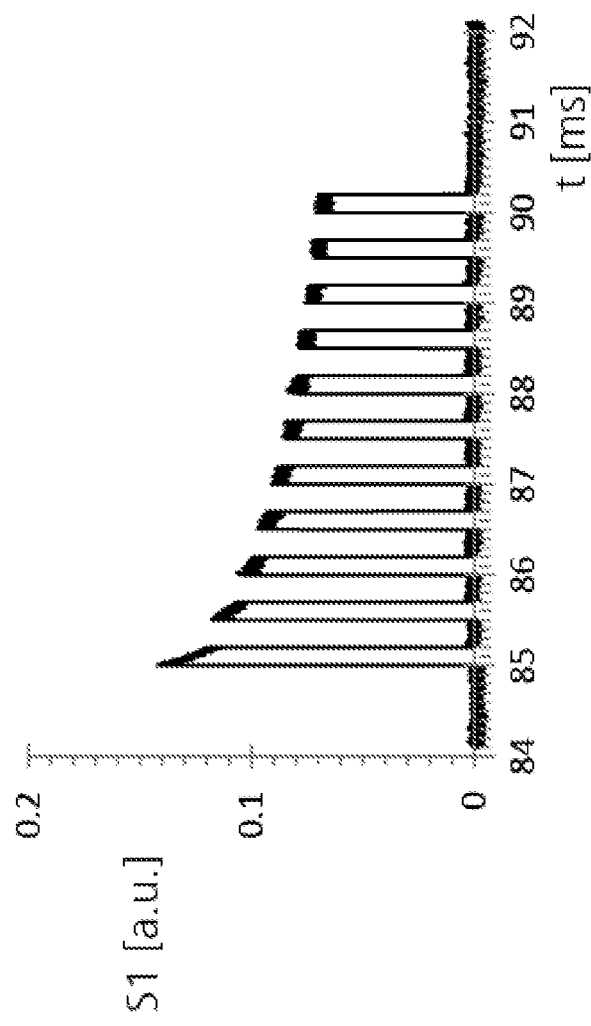
Fig. 5a
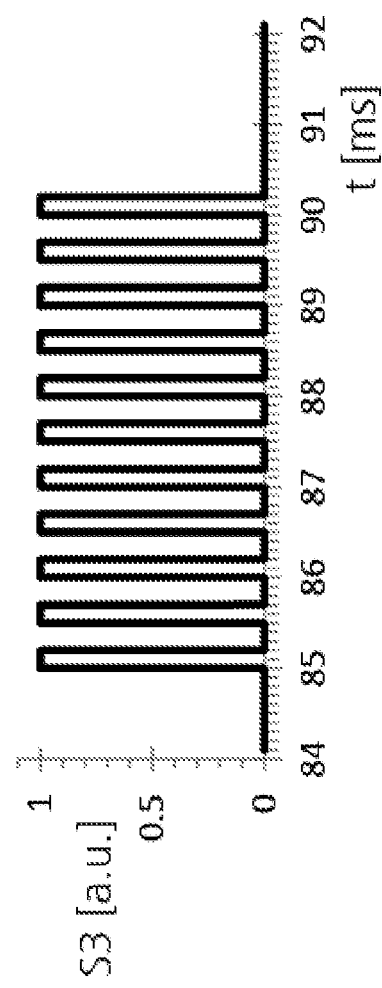
Fig. 5b

OPTICAL STORAGE PHOSPHOR, METHOD FOR CHECKING AN AUTHENTICITY FEATURE, DEVICE FOR CARRYING OUT A METHOD, AUTHENTICITY FEATURE AND VALUE DOCUMENT

The present invention relates to an optical storage phosphor (also referred to below as OSP), in particular for detecting the authenticity of a value document, to a method for checking an authenticity feature having an optical storage phosphor, to an apparatus for carrying out a method for checking an authenticity feature, to an authenticity feature having an optical storage phosphor, and to a value document having an authenticity feature having an optical storage phosphor.

TECHNICAL BACKGROUND

In order to protect value documents, such as, for example, banknotes or passports, against forgery, material security features have been applied to or introduced into these value documents for a long time, the presence of said features being detected by measuring their characteristic properties and being employed to authenticate the value document. For example, in the case of the photoluminescence of solid particles under defined illumination, an emission spectrum is generated which is then assessed in characteristic ranges, for example by comparison to a reference. In particular for high-security features and in machine processing, it is necessary for these characteristic properties of the security features to be found sufficiently precisely in automated manner and to be specific.

As optical storage phosphors (OSP), substances are referred to such as suitably doped alkaline earth sulfides (e.g. SrS:Eu,Sm), halides (e.g. BaFBr:Eu), aluminates (e.g. $SrAl_2O_4$:Eu,Tm), oxides (e.g. MgO:Tb, BeO, $Al_2O_3$:C) and further substances which absorb energy in the form of X-ray, UV, VIS, or radioactive radiation, store said energy and release it again in the form of luminescence only under targeted stimulation. When light is used as a stimulus, this is called optically stimulated luminescence (OSL).

In order to understand OSP, the mode of operation thereof is explained below: In an inorganic OSP there are luminous centers and trap centers. The luminous centers are excited with light. At least some of the excited charge carriers transition from the luminous centers into a conduction band of the OSP, while the remaining charge carriers relax into the ground state of the luminous centers while emitting photoluminescence. The charge carriers in the conduction band can diffuse and part of these charge carriers reach trap centers at which they are bound. A trap center is initially excited by receiving a charge carrier. From this excited state, it then transitions into its ground state mostly without radiation. As a result, the received charge carrier is stored in the ground state of a trap center (trap state). There it can be stored up to geological time periods of $10^5$ years. This property is employed, for example, for geological dating. After specific excitation of a charge carrier from a trap center, this charge carrier can reach the conduction band again. In the conduction band, this charge carrier diffuses and can reach a luminous center where it is bound. By receiving the charge carrier at the luminous center, this luminous center is initially in an excited state, from which it then transitions into its ground state while emitting its characteristic luminescence. The luminescence has a characteristic spectral distribution and intrinsic lifespan. During the diffusion of the charge carriers through the conduction band, a light-induced, persistent conductivity can be found, inter alia, as a characteristic property of OSP.

In distinction to OSL, the excited charge carrier is brought into a triplet state upon phosphorescence in the luminous center itself. From this triplet state, it relaxes into a different state of the luminous center with a characteristic time constant. This means that in the case of phosphorescence, a change in the spin diversity is involved (see also IUPAC Gold Book: Phosphorescence, 23 Aug. 2017). In distinction to phosphorescence, however, a reversible, light-driven donor-acceptor reaction takes place in the OSP. In a simplified representation of this reversible, light-driven donor-acceptor reaction, during the storage process, the luminous center emits a charge carrier as donor (usually the luminous center is oxidized) and a trap center different therefrom receives the charge carrier as acceptor (the trap center is thus usually deoxidized). In particular, in "Persistent luminescence beats the afterglow: 400 years of persistent luminescence", Electrochem. Soc. Interface (2009), 18 (4), pages 42-45, Hölsä describes the fundamental differences between OSP and phosphorescence.

In OSPs, the excitation spectrum of the charge carriers bound to trap centers (read-out spectrum) is independent of the excitation spectrum (charging spectrum) or emission spectrum of the luminous centers. In this respect, optically stimulated luminescence is also delimited against the usual upconversion or anti-Stokes phenomena induced by simultaneous multiphoton processes: Both with regard to the charging spectrum and the emission spectrum of the luminous centers, there is no necessary physical reference to the read-out spectrum of the (deoxidized) trap centers. In general, the reading out wavelengths can thus be shorter, equal to or longer than the emission wavelength.

For employing such storage phosphors as an authenticity feature, there are isolated disclosures in the literature. For example, the document U.S. Pat. No. 4,387,112 discloses the general possibility of using storage phosphors as a security feature and for this purpose in particular describes sulfides such as, for example, (Zn,Cd)S:Cu.

In the publication EP 1 316 924 A1, the authenticity check is effected via the detection of photoluminescence or the occurrence of optically stimulated luminescence (OSL) of substances such as BaFBr:Eu or CsBr:Eu.

An inorganic storage phosphor (such as SrS:Eu,Sm or $Sr_4Al_{14}O_{25}$:Eu,Dy) and an upconverter phosphor are employed in the publication WO 2010/0064956 A1.

The publication DE 10 2011 010756 A1 describes manufacturing methods for silicate-coated nanoparticulate storage phosphors and the possible use thereof as markers.

The above-described methods dispense with a quantitative evaluation of the dynamic and characteristic storage behavior of an OSP as an authenticity feature and are based instead on reproducible measurements of defined system states. This type of check potentially enables an imitator to collect information that makes it easier for him to counterfeit the substance. A successful material counterfeit would then also pass the authenticity check.

Further, the OSP known from the prior art are often chemically unstable (such as BaFBr:Eu, SrS:Eu,Sm, $Sr_4Al_{14}O_{25}$:Eu,Dy) or unstable to light influences (such as ZnS:Cu,Co, (Zn,Cd)S:Cu) and optionally have to be stabilized elaborately with a coating. In addition, the toxicity of some substances (such as BaFBr:Eu) and/or their decomposition products (e.g. hydrogen sulfide, barium, fluoride, or cadmium ions) and/or the starting substances (e.g. $BaCl_2$) does not only represent an obstacle for the application, but also requires increased expenditure in the manufacture and disposal as compared to stable non-toxic substances.

Moreover, currently available optical storage phosphors additionally have at least one further of the following disadvantages: non-adjusted spectral storage properties, slow intrinsic luminescence, intensive persistent luminescence (so-called afterglow), slow readability—these three last-specified effects make it difficult to employ an OSP as a rapidly machine-readable authenticity feature—, necessity of high-energy charging and low intensity of emission.

DESCRIPTION OF THE INVENTION

Proceeding from the technical background described above, it is an object of the invention to supply an optical storage phosphor which, in particular, solves the above-specified disadvantages of known optical storage phosphors. Further objects are supplying a method for checking an authenticity feature and an apparatus for carrying out such a method, wherein increased security is to be achieved in comparison to the known methods. Further, it is intended to supply an authenticity feature and a value document having an improved storage phosphor.

These objects are achieved, in particular, by an optical storage phosphor described here, a method for checking an authenticity feature, an apparatus for carrying out a method, an authenticity feature and a value document having the features of the independent patent claims. Advantageous developments result from the subclaims, the description, the figures and the embodiment examples described in connection with the figures.

Accordingly, an optical storage phosphor is stated which is based on a garnet structure and has the following composition:

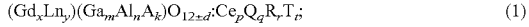

$$(Gd_xLn_y)(Ga_mAl_nA_k)O_{12\pm d}:Ce_pQ_qR_rT_t; \quad (1)$$

wherein:
Ln comprises at least one of the following elements: La, Lu, Y;
A comprises at least one of the following elements: Ge, Sc, Si;
Q comprises at least one of the following elements: Ag, Cr, Hf, Mo, Nb, Sn, Ta, Ti, W, Zr; preferably at least one of the elements Ag, Mo, Nb, Sn, Ti, Zr;
R comprises at least one of the following elements: Bi, Pr, Nd, Sm, Eu, Tb, Dy, Ho, Er, Tm, Yb;
T comprises at least one of the following elements: F, Li, Mg, K, Na, B; preferably at least one of the elements F, Li;
$1.0 \leq x \leq 3.2$ and $0 \leq y \leq 1.65$;
$0.5 \leq m \leq 5.2$, $0 \leq n \leq 4.7$ and $0 \leq k \leq 0.5$, wherein $4.8 \leq m+n+k \leq 5.2$;
$0 \leq p \leq 0.1$, wherein $p=0$ only for $Q=Zr$; wherein preferably $0.001 \leq p \leq 0.1$;
$0 \leq q \leq 0.05$;
$0 \leq r \leq 0.05$;
$0 \leq t \leq 0.1$;
$0 \leq d \leq 0.5$;
$p+q > 0.002$;
$q+r > 0.002$; and
$2.8 \leq x+y+p+r \leq 3.2$.

By deviations from a formally charge-neutral stoichiometry and/or by deviating charge and/or by deviating ion radii of co-doped ions (co-dopants) in comparison to the underlying garnet structure of the host lattice of the OSP described here, a defect structure is supplied in the specified host lattice. The co-doped ions and the defect structure triggered thereby are an essential component of the substance described here.

The optical storage phosphor described here is an inorganic, oxidic substance with a defect-rich garnet structure as the host lattice, preferably with cerium as the luminous center. At the basis, there is the ideal charge-balanced formulation of a gadolinium-aluminum garnet, $Gd_3Al_5O_{12}$. By targeted deviation from the ideal charge-balanced stoichiometry and suitable co-dopants, a storage phosphor can be supplied which is distinguished by its stability, its rapid readability, its adjusted read-out spectrum and/or its chargeability in the blue spectral range.

The defect structure which can already be influenced by small variations in the substance composition and substance manufacture is part of the substance, since it substantially determines the properties and thus the distinguishability of a certain substance from other substances of similar composition.

When considering the trap centers and luminous centers of the OSP described here, these represent independent optical systems. It has surprisingly been found here that the storage behavior of the OSP can be changed and adjusted by influencing the defect structure of the OSP in targeted manner. Moreover, surprisingly, this targeted adjustment can be effected by chemical modification of the trap centers, of the luminous centers and of the garnet (i.e. of the solid body which includes the trap centers and luminous centers) of the OSP. Firstly, the optically stimulated luminescence can be promoted in targeted manner via deviations from the ideal stoichiometry of the garnet and its composition, and the thermoluminescence at room temperature (also referred to as afterglow or persistent luminescence) can be inhibited. Secondly, parameters of the optically stimulated luminescence, such as, for example, associated characteristic memory properties (for definition see below), read-out speed and read-out spectrum, can be set in targeted manner by means of different co-dopants and modifications to the underlying garnet. Thus, for a constant charging and emission behavior (due to the properties of the luminous centers) in the storage behavior (due to the properties of the trap centers) optimized substances can be achieved for the respective use. It results that the storage behavior of the OSP is accessible to a targeted adjustment by chemical modification.

The chemical nature and the crystallographic properties of the trap centers, luminous centers and/or host lattices of the OSP determine the relative energetic position of the involved states ((energy) levels), for example trap states, ground states, excited states, and of the conduction band.

The above-described optical storage phosphor is based, in particular, on the following findings and insights. The formulation of a stoichiometric gadolinium-aluminum garnet, referred to in simplified terms as $(Gd_3)(Al_5)O_{12}$, is taken as a basis. The storage phosphor described here is supplied by at least one of the modifications described below (modifications 1 to 8). The modifications can be effected as formal replacements, excess, deficiency and/or supplements.

1. Gadolinium (Gd) is partly replaced by one or several rare earth elements from the group (lanthanum (La), lutetium (Lu), yttrium (Y)). The combinations (Gd and Y), (Gd and La) are preferred. The combination of Gd and La is particularly preferred.

2. Aluminum (Al) is completely or partly replaced by one or several elements of the group comprising gallium (Ga) or scandium (Sc). In addition, Al can also be partly replaced by silicon (Si) and/or germanium (Ge). Preferably, Al is partly replaced by Ga.

3. In comparison to the stoichiometric charge-balanced formulation of a gadolinium-aluminum garnet $(Gd_3)(Al_5)O_{12}$, the rare-earth elements specified above in the $1^{st}$ section can be present at the gadolinium position in a manner deviating in total from the stoichiometric amount in order to stabilize the defect structure.

4. In comparison to the stoichiometric charge-balanced formulation of a gadolinium-aluminum garnet $(Gd_3)(Al_5)O_{12}$, the elements specified above in the $2^{nd}$ section can be present at the aluminum position in a manner deviating in total from the stoichiometric amount in order to stabilize the defect structure.

5. The substance resulting after the above steps is preferably doped with cerium, which occupies the site of one of the ions of the rare earth elements (cf. $1^{st}$ section) (Gd, La, Lu, Y).

The modifications from sections 1 to 5 concern the host lattice (garnet) in its composition and the deviations from the ideal stoichiometry and the luminous centers. $Ce^{3+}$ ions preferably represent the emitting luminous centers (also referred to below as emitters). It has been found that, with the above-specified deviations from the formulation of a stoichiometric, in particular cerium-doped, gadolinium-aluminum garnet, there can be influenced both the defect structure of the optical storage phosphor and its band gap and the associated position of the electronic level with reference to the doping ion and thus the position of the levels in the luminous centers and trap centers. This has an effect on the attainable intensity of the optically stimulated luminescence, the charging and read-out spectra and the attainable read-out speed and intensity of the afterglow.

Furthermore, the following modifications can be carried out:

6. One or several elements from the group Ag, Cr, Hf, Mo, Nb, Sn, Ta, Ti, W, Zr can be selected as co-dopant. These ions can lead to a more complex substitution, above all concerning the Al position, but also with an effect on the Gd position. In particular, no charge neutrality of the nominal formulation is forced by the addition of, for example, alkaline earth ions. It has turned out here that the defect structure of the OSP can be influenced in targeted manner thereby, and thus trap states can be supplied.

7. Instead of or in addition to the co-dopants specified in the previous $6^{th}$ section, one or several elements from the group Pr, Nd, Sm, Eu, Tb, Dy, Ho, Er, Tm, Yb and bismuth (Bi) can also be selected for doping. These ions can supply suitable trap states.

8. Further, one or several of the elements B, F, Li, Mg, K and/or Na can be co-doped. This can be achieved, for example, via the fluxing agent used, such as LiF or $H_3BO_3$. It has been found here that these elements influence the afterglow and the read-out speed of the storage phosphor.

The chemical modifications of sections 6 to 8 are regarded as co-dopants, since they are present only in a low concentration (comparable to the concentration of the luminous centers) and/or exert complex influences on the defect structure of the OSP due to differing ion sizes and or deviating ion charge (in each case with reference to the host lattice). With reference to the modifications according to the above sections, the following effects were observed: Co-dopants according to the above $6^{th}$ section can control the defect structure of the OSP as well as the dopants according to the $7^{th}$ section. The difference between the two dopants from the $6^{th}$ section and the $7^{th}$ section lies in particular in the site of the substitution, wherein the elements from the $7^{th}$ section replace the rare earth elements (La, Gd, Y, Lu) previously specified in the $1^{st}$ section at the gadolinium position. The elements from the $8^{th}$ section represent dopants which, in specific combinations, can positively influence the formation of the defect structure.

In this application, the employment of indefinite articles, such as "a," "an", etc. is not to be understood as limiting. In particular, an indefinite article can be understood as meaning both a single number and a plurality, for example in the sense of "at least one" or "one or several", as long as this is not explicitly ruled out, such as, for example, by the term "exactly one". Further, in this application decimal places are generally represented with a point, in particular according to the type "x.y", where "y" states the first value of the decimal place.

When a chemical variable, in particular Ln, A, Q, R and T, is employed in this application, the wording "comprises one of the following elements" means in particular that the variable is formed with one of the elements or a combination of the elements specified with reference thereto. It is also possible that an element molecule in which two or more atoms of a single chemical element bond to form a molecule is meant as a combination of the elements. For example, T can be configured as $F_2$.

In this application, the terms "dopant" or "co-dopant" and word formations derived therefrom refer to substances which are deliberately fed in the manufacturing process and whose concentration (typically 300 ppm) significantly exceeds the typical concentration (about 100 ppm) of impurities in the raw materials. When the concentration of an element in the nominal substance formulation is denoted by "0", this element is not deliberately fed and is present at most at a concentration caused by impurity of the raw materials. The above-introduced designation of a dopant or co-dopant starting from the given minimum concentration is based on an observed effectiveness in the substance according to the invention.

The OSP is based on a garnet structure. The OSP preferably has a garnet structure as the basic structure, wherein further secondary phases can occur to a small extent due to the manufacturing process. A garnet structure can be described in generalized manner in the form $\{X_3\}[Y_2](Z_3)O_{12}$. The brackets denote {.} dodecahedrally, [.] octahedrally and (.) tetrahedrally coordinated lattice sites. Furthermore, garnet structures are known from Geller, S. (1967), Crystal chemistry of the garnets, Zeitschrift für Kristallographie-Crystalline Materials, 125(1-6), 1-47, and Grew, E. S. Locock, A. J., Mills, S. J., Galuskina, I. O., Galuskin, E. V., Halenius, U. (2013): Nomenclature of the garnet supergroup, IMA Report, American Mineralogist, Volume 98, 785-811, the content of which is incorporated herein by reference.

The starting point for the optical storage phosphor described here is formally the gadolinium-aluminum garnet, the ideal charge-neutral stoichiometry of which can be stated as $\{Gd_3\}[Al_2](Al_3)O_{12}$, in simplified manner as $(Gd_3)(Al_5)O_{12}$. Elements are replaced by dopants on this gadolinium-aluminum garnet, so that the OSP described here with its preferred properties is then achieved. The deviation required here from the stoichiometric description is formally compensated by stating the oxygen proportion $O_{(12+d)}$ and the specified proportion $T_r$. This formal description reflects that, as a result of the formation of defects (for example missing or superfluous oxygen atoms), the charge neutrality of the resulting substance is established, since no ions are explicitly added for a formally forced charge equalization. The exact value of d is established thereby. The totality of the defects occurring in the OSP together with the electronic states caused thereby is referred to as defect structure or defect states. The defect structure describes the effect of local defects and is complementary to the periodic crystal structure which produces the non-local properties.

The OSP described here has charge carriers (preferably: electrons), luminous centers and trap centers. Luminous centers and trap centers are optically active systems in the storage phosphor described herein. The luminous centers are in particular configured to be light-emitting, i.e. they can transition from an excited state of the luminous centers into a ground state of the luminous centers while emitting photons. In the trap centers, electrons can transition from the conduction band into an excited electronic state of the trap centers and relax from there, in particular without radiation, into the ground state of the trap centers. There, they remain stored until sufficient energy is again fed by a suitable—preferably optical—process to raise these stored electrons back into the conduction band. The ground states of trap centers are referred to as trap states.

Light which is suitable (for example with regard to its wavelength and intensity) to charge the OSP is referred to as charging light. Light which is suitable (for example with regard to its wavelength and intensity) to read out the OSP is referred to as read-out light. A pulse of charging light is referred to as charging pulse and a pulse of read-out light is referred to as read-out pulse.

The OSP described here is preferably adapted such that, by the application of a charging pulse and/or of a succession of charging pulses (referred to as charging sequence), the charge carriers transition at least partially from the luminous centers into the trap centers and/or, by the application of a read-out pulse and/or of a succession of read-out pulses (referred to as read-out sequence), transition at least partially from the trap centers into the luminous centers. It is possible, in particular, for the OSP to have electrons which are present in the trap centers before the application of the read-out sequence and are energetically lifted by the application of the read-out sequence and diffuse in the conduction band. This leads to an instantaneous (light-induced) increased conductivity of the optical storage phosphor.

The luminous centers and the trap centers are in each case defect centers in the crystal lattice, which are supplied, for example, by co-doping with two different elements. Further, the defect centers can be produced in targeted manner in a material by high-energy irradiation (for example with particle radiation, gamma radiation and/or X-ray radiation) and/or also by the process management in the manufacture of the optical storage phosphor (for example quenching of the melt).

In particular, luminous centers and trap centers differ from one another by their spatial position within the OSP and/or by their chemical identity. Charging the OSP with a charging pulse can correspond to an oxidation of the luminous centers and a deoxidation of the trap centers. Conversely, the read-out of the OSP with a read-out pulse can correspond to a deoxidation of the luminous centers and an oxidation of the trap centers.

Thus, various light-matter interactions can occur in an OSP described herein:

By applying a charging pulse (charging), charge carriers are excited from the ground state at the luminous centers. The charging pulse has, in particular, a defined wavelength and/or a defined pulse duration and/or a defined pulse energy. A charging pulse can have one or several (peak) wavelengths (maxima of the spectral distribution). For example, the charging pulse is configured as a laser pulse. Besides the wavelength, the pulse duration and the pulse energy, the beam size and/or the power of the charging pulse can also be utilized for the definition thereof. Several consecutive charging pulses are referred to as charging sequence, wherein measured values can be recorded in particular between the individual charging pulses.

After charging, some excited charge carriers can relax spontaneously radiatively at the luminous center. This corresponds to the known photoluminescence and is referred to herein as intrinsic luminescence. The intrinsic luminescence has, in particular, a characteristic decay time, which is also referred to as intrinsic lifespan. Other excited charge carriers can transition to the trap centers and can be stored there.

The charge carriers, which are stored at the trap centers, can be excited by energy input, can transition to the luminous centers, and can relax radiatively there. If this energy input is effected thermally, this is called thermoluminescence. The thermoluminescence at room temperature is also referred to as afterglow or persistent luminescence.

The energy input is preferably effected optically by applying a defined read-out pulse (read-out). The read-out pulse has, in particular, a defined wavelength and/or a defined pulse duration and/or a defined pulse energy. A read-out pulse can have one or several (peak) wavelengths. For example, the read-out pulse is configured as a laser pulse. Besides the wavelength, the pulse duration and the pulse energy, the beam size and/or the power of the read-out pulse can also be utilized for the definition thereof. Several consecutive read-out pulses are referred to as read-out sequence, wherein measured values can be recorded in particular between the individual read-out pulses.

When charge carriers from the trap centers are excited by a read-out pulse and then relax radiatively at the luminous centers, this is called optically stimulated luminescence (OSL). The OSL has in particular an intensity and a wavelength spectrum (emission spectrum).

When the intensity of the OSL is measured for each read-out pulse of a read-out sequence and stored in a time series, the read-out curve I(t) is obtained. Alternatively, a single read-out pulse can also be applied which persists until the intensity of the OSL has decreased noticeably, for example to 50% or 10% of the initial value. The obtained signal intensity of the OSL depends on the intensity and wavelength (read-out spectrum) of the irradiated read-out light, and on the history of the measurement. A higher intensity of the read-out pulse leads to an initially increased OSL signal intensity and a faster read-out of the substance. The influence of characteristic, substance-specific effects, for example transport and retrapping effects, collective energy transfer processes and radiation-free contributions, then leads to deviations from a purely exponential behavior of the read-out curve. The shape of the curve thus depends on properties of the substance, on the temperature and other environmental influences, and on the wavelength, intensity and temporal progression of the reading-out light (for example read-out sequence or single read-out pulse).

In the case of a single, long-lasting read-out pulse, the read-out curve can be empirically adjusted preferably with a power function of the type $$I(t) = (a + bt)^{-\frac{1}{b}} + c,$$

where t=0 denotes the start of the read-out and a, b and c represent characteristic parameters of the adjustment which are caused by properties of the substance, of the read-out light and of the ambiance. When two substances are compared under the same read-out sequence or the same single read-out pulse at defined ambient conditions, the read-out curve is substance-specific. The specific authenticity assessment is based on this connection.

The OSP described here has, in particular, a charging spectrum. The charging spectrum describes how effectively the OSP can be charged with charging pulses of different wavelengths. In order to determine the charging spectrum, a fixed read-out pulse is first defined. The OSP is then prepared (for example by repeated application of the defined read-out pulse) in such a manner that it does not show any OSL—then essentially no charge carriers are stored at the trap centers. To the OSP thus prepared there is now applied a charging pulse, the spectrum of which is essentially composed only of one defined wavelength. Subsequently, the defined read-out pulse is applied thereto and the intensity of the OSL is measured. The measured intensity is stored together with the wavelength of the charging pulse as a pair of values. This process (preparation of the OSP, charging, reading out, measurement of the intensity, storage of the pair of values) is now repeated for other charging pulses which differ from one another only in their wavelength. It is important here to always employ the same defined read-out pulse. The totality of the pairs of values thus obtained yields the charging spectrum.

In a preferred embodiment, an OSP is selected, the charging spectrum of which has at least one local minimum, in which the intensity of the OSL is reduced by at least 10% in comparison to the two flanking maxima.

The OSP described here can alternatively or additionally have a read-out spectrum. The read-out spectrum describes how effectively the OSP can be read out with read-out pulses of different wavelengths. In order to determine the read-out spectrum, a predetermined charging pulse is first defined. The OSP is prepared (for example by repeated application of a read-out pulse) in such a manner that it does not show any OSL—there are then essentially no charge carriers stored at the trap centers. To the OSP thus prepared the defined charging pulse is now applied. Subsequently, a read-out pulse is applied thereto, the spectrum of which consists substantially only of one defined wavelength, and the intensity of the OSL is measured. The measured intensity is stored together with the wavelength of the read-out pulse as a pair of values. This process (preparation of the OSP, charging, reading out, measurement of the intensity, storage of the pair of values) is now repeated for other read-out pulses which differ from one another only in their wavelength. It is important here to always employ the same defined charging pulse. The totality of the pairs of values thus obtained yields the read-out spectrum.

The OSP preferably has a read-out spectrum with a pronounced spectral structure. In particular, the read-out spectrum has at least one local minimum, in which the intensity of the OSL is reduced by at least 10%, particularly preferably by at least 30%, in comparison to the flanking maxima.

As already mentioned, the OSP described here is distinguished in particular in that it has a memory with reference to at least one property. In particular, measurable properties of the OSP depend on the history of the measuring process employed for measuring the properties (so-called non-commutation). This results in a path dependency of the measurement result. Examples of characteristic memory properties are listed further below in this description. This means that a measurement influences the result of the at least one subsequent measurement. The measuring process is, in the following, an application of a light signal to the OSP and the recording of a measured value (measurement result) in response to this light signal. The light signal is, in particular, a charging pulse and/or a read-out pulse. Several consecutive measuring processes are referred to as measurement sequence, in particular a measurement sequence can comprise both charging and read-out pulses.

The OSP described here is preferably distinguished by the following property: Two different optical storage phosphors can have an identical property under a first measurement sequence, whereas they can have different properties under another measurement sequence that differs from the first measurement sequence only in parameters such as intensity, sequential arrangement or duration of read-out pulses. This property is particularly advantageous for employment as an authenticity feature in a value document. The value document can include a so-called authentic OSP as an authenticity feature. It may be possible for a forger to generate a counterfeit OSP which has the same properties as the authentic OSP under the first measurement sequence. However, it can be detected by means of the second measurement sequence that the counterfeit OSP does not correspond to the authentic OSP.

The OSP described here preferably has non-commutation for different measuring processes, i.e. the sequential arrangement of the measuring processes is not interchangeable. For example, the OSP is read out with a first and a second measuring process. Here, it is possible for the first measuring process to influence the system in such a manner that the result of the second measuring process depends on the first measuring process. A change in the sequential arrangement of the measuring processes can then lead to a different measurement result. A potential forger must therefore know the measuring processes employed for the authenticity assessment and the succession in the measurement sequence for counterfeiting the authentic OSP. This makes the forgery and counterfeiting of the OSP considerably more difficult.

Examples of characteristic memory properties are described below, together with preferred embodiments of the OSP. The values of the memory properties are dependent on the measurement sequence employed and/or the ambient conditions which, in application, produce the close linkage of authenticity feature and authenticity detection method. Besides the memory properties designated, other measurands, such as, for example, the curvature of the read-out curve, can also be utilized as an authenticity criterion.

Read-Out Speed of the OSP

In the OSP, this quantity describes how rapidly a substance can be read out or how rapidly the trap centers are emptied of stored charge carriers. It can be described as a relative decrease in the OSL between two identical read-out pulses. Alternative descriptions of the read-out speed consider, for example, the slope of the read-out curve at specific points (for example at the start, in the middle or at the end of the read-out curve). For pulsed read-out sequences, for example, the maximum or average signal values under the respective read-out pulse for this purpose can be assigned to the number of the respective read-out pulse and can thus parameterize the read-out curve.

For example, material properties influence the read-out speed, namely stimulability by the read-out pulse and charge transport properties, as well as different probabilities for the stimulated charge carriers to be trapped in (other) trap centers. Furthermore, parameters of the read-out pulse, such as wavelength or pulse energy, influence the measured read-out speed.

Charging Speed of the OSP

In the OSP, this quantity describes how rapidly and/or effectively a substance can be charged. It can be described, for example, as a relative increase in the OSL between two identical charging pulses.

The charging speed can be measured, for example, as follows:
- definition of a fixed read-out pulse and a fixed charging pulse;
- preparation of the OSP so that it does not show any OSL (e.g. by repeated application of the defined read-out pulse);
- applying the defined charging pulse;
- applying the defined read-out pulse and measuring a first intensity of the OSL.
- renewed preparation of the OSP so that it does not show any OSL (e.g. by repeated application of the defined read-out pulse);
- applying the defined charging pulse at least twice;
- applying the defined read-out pulse and measuring a second intensity of the OSL.
- The charging speed is yielded as the quotient of the second and the first intensity.

The charging speed depends on material properties of the OSP, such as, for example, the charge transport properties or the intrinsic luminescence, as well as parameters of the charging pulses such as, for example, wavelength or pulse energy.

Memory Depth

The memory depth of an OSP states how long further back in time an event under illumination with a read-out light can have taken place in order to significantly influence the result of a measurement. In an OSP, the memory depth can cover a few microseconds up to many hours.

In the implementation, for example, the memory depth of an OSP is considered under continuous illumination with a read-out light. In this implementation, the OSP is charged with a defined charging pulse. For this purpose, a long-lasting intensive pulse (e.g. power>1 W, illumination area 1 $mm^2$ and duration 20 s) at a suitable wavelength (e.g. 450 nm) is preferably used. A continuous read-out light is then applied to the OSP until the read-out curve has fallen below a predefined threshold relative to its initial value (for example below 1% of the maximum signal). For example, the required period of time can be utilized as a measured value for the memory depth. Since the shape of the read-out curve underlying the measurement is not incorporated in the definition of the memory depth, the read-out speed and the memory depth are related, but describe different aspects of the memory of an OSP.

Persistence

The persistence of an OSP states how long an event can be stored in the OSP without illumination, but under the influence of the ambiance. In the OSP, the trap occupation can change over time (so-called "fading"), since non-radiating relaxation paths are also accessible at room temperature. As a possible method for measuring the persistence, after a charging pulse the waiting time until the first pulse of the subsequent read-out sequence can be varied. For example, the waiting time is varied between 1 ms and 100 ms. From the comparison of the read-out curves for different waiting times, suitable measures of persistence such as the intensity persistence (stability of the signal maximum of the read-out curve with respect to the waiting time) or speed persistence (stability of the read-out speed with respect to the waiting time) can be determined. For this purpose, the OSP can, for example, be prepared before each charging in such a manner that it does not exhibit any measurable OSL (for example by repeated application of a read-out pulse).

The OSP preferably has a long persistence at the charging pulses employed and the selected environmental conditions. As a result, the charging and the read-out can be temporally and spatially decoupled. Alternatively, it is possible for a short persistence of the memory to be selected in order to couple the charging and the read-out temporally and spatially, as a result of which rapid machine-processing is permitted and forgery is further made more difficult.

In a further preferred embodiment, the OSP and the charging pulse(s) are selected in such a way that the persistence of the memory is adjusted to the processing speed, i.e. the persistence of the memory is set such that the memory is stable for the duration of the processing starting from a waiting time of 50 µs, particularly preferably from a waiting time of 20 µs, after charging.

Interchangeability (Also Referred to as Commutation)

The interchangeability states whether two measuring processes on an OSP yield different results in dependence on their sequential arrangement. In principle, two measuring processes are not necessarily interchangeable for OSP. This can be easily shown by considering a charging pulse and a read-out pulse as a sequence of measuring processes. The respective measurement signals under the succession of charging pulse—read-out pulse differ from those under the succession of read-out pulse—charging pulse. If it is additionally assumed that the measuring process comprises a charging pulse and two read-out pulses, the measurement result for the second read-out pulse depends on the sequential arrangement in which the charging pulse and the first read-out pulse were carried out. Even carrying out the same measuring process (such as two charging or read-out pulses one after the other), generally does not yield the same signal. This means that storage phosphors represent memory-bearing systems, i.e. the measurement result depends greatly on the history.

Continuity of Memory

In an OSP, this quantity describes to what extent an event in the present can overwrite the memorization of past events. For example, a temporary interruption of an otherwise uniform read-out sequence represents such an event. In this case, a measurement of the continuity of the memory can be achieved, for example, in that an OSP is charged with a charging pulse and subsequently read out with a uniform succession of five identical read-out pulses. Then, the OSP is not illuminated for a period of time that corresponds to the duration of the preceding read-out sequence of five pulses. Subsequently, the OSP is again read out with the same succession of five read-out pulses. In order to assess the continuity of the memory, it is utilized whether the two read-out curves can be combined into a single continuous read-out curve before and after the interruption.

If the sections can be continuously combined before and after the interruption, the memory is referred to as continuous under this read-out sequence. If, in the case of such a composition, there occur steps in the read-out curve or changes in the read-out speed, the memory is referred to as non-continuous under this read-out sequence. The type and shape of the step (too great or too small signal compared to the target, rising or falling) are also characteristic here. Such deviations from a continuous memory can occur, for example, through parasitic processes, such as retrapping of the charge carriers in trap states, direct relaxation or tunneling relaxation, and can already occur in a measurable manner on the time scale as of about 10 µs. A possible continuity measure (i.e. a measured value derived from the measurement) compares the estimated continuation of the read-out curve with the curve actually measured under the given read-out sequence immediately after the interruption. The continuity thus states how strongly an event can influence the "memorization", i.e. the recognizability of past measuring processes.

Instead of an interruption, a different event such as, for example, a further read-out pulse of a different type, a charging pulse or also a temporary change in temperature can also be considered.

In a particularly preferred embodiment, the OSP and the read-out sequences are selected in such a manner that the memory of the selected optical storage phosphor is substantially continuous under the selected read-out sequences. For example, for an interruption of 100 µs, the maximum OSL intensity during the first read-out pulse after the interruption deviates by less than 10% from the minimum OSL intensity during the last read-out pulse before the interruption.

Sensitivity

The sensitivity of an OSP states how the OSL changes with the parameters of a measuring process. This has been described above by way of example for the dependence on the wavelength of charging pulses (charging spectrum) and read-out pulses (read-out spectrum). Alternatively, it is also possible to measure the dependence of the optically stimulated luminescence on further parameters of the read-out pulses, such as, for example, pulse duration or pulse intensity. For this purpose, for example, the OSP is charged by a charging pulse and the read-out curve is determined under a first read-out sequence for which, in particular, the first read-out pulse is designated as the reference read-out pulse. The OSP is then charged again with the same charging pulse as before and the read-out curve is determined under a second read-out sequence which again includes the reference read-out pulse as the first read-out pulse and whose further read-out pulses differ only in intensity from those of the first read-out sequence. The specified difference in intensity is preferably arranged to be the same for all relevant read-out pulses in the form of a percentage scale. If the charging pulse has been selected such that the same signal values are achieved under the reference read-out pulse of the first and the reference read-out pulse of the second read-out sequence, the sensitivity of the OSP with reference to the intensity of the read-out light can be ascertained on the basis of the read-out curves under the first and under the second read-out sequence. For example, the sensitivity of the OSP with reference to the intensity of the read-out light can be determined as the sum of the quadratic difference of the signal values of the first and second read-out curves. The greater this value, the greater the sensitivity of the OSP under an intensity change.

Associativity

Associativity in an OSP describes how different measuring processes with simultaneous or consecutive action influence the OSL in comparison to the situation in which only one of the measuring processes acts in each case. For example, the intensity of the OSL depends on whether two different read-out pulses act successively on the substance or overlap in time.

Memory Strength

The memory strength of the OSP describes how strongly a first measuring process influences a later second measuring process. In comparison to the memory depth, which concerns a time period, the memory strength concerns a quantitative or qualitative influence of the at least one subsequent measuring process. In order to assess the memory strength, for example, the OSP can be charged with a defined charging pulse (e.g. power 0.3 W, illumination area 4 mm$^2$ and duration 20 ms) at a suitable wavelength (e.g. 450 nm). Then, a continuous read-out light (e.g. peak wavelength 650 nm, power 450 mW, focused beam) is applied to the OSP until the read-out curve has fallen below a predefined threshold relative to its initial value (for example below 20% of the maximum signal). The read-out curve is then adjusted with a power function of the type $$I(t) = (a+bt)^{-\frac{1}{b}} + c.$$

While the parameter a is connected to the memory depth, the quantity $$\frac{1}{b}$$

offers a measure for memory strength. When two different substances are measured as stated above and, for the same measurement conditions the values of the quantity $$\frac{1}{b}$$

are determined on the basis of the adjustments in each case, the substance with the greater value $$\frac{1}{b}$$

also exhibits the higher memory strength. An increase in the memory strength can be advantageous for detecting authenticity, since it is accompanied by an increased influence of the memory of the OSP on the measurement, which in turn promotes the close linkage of property and detection of authenticity.

Besides the memory properties specified by way of example, the OSP described here can have further advantageous properties. It is advantageous to supply substances with different embodiments of the advantageous properties, since a group of distinguishable substances is thus present as a feature system from which one or several substances can then be selected for a specific application. According to at least one embodiment, the OSP is configured to be readable by light irradiation. In other words, the OSP has a read-out spectrum which lies in the visible range, in the UV range and/or in the IR range of the electromagnetic spectrum.

In one embodiment, the read-out spectrum of the OSP described here has a maximum in a wavelength range of at least 360 nm to at most 1200 nm; preferably it has a local maximum in a wavelength range of at least 380 nm to at most 420 nm. This wavelength range lies both below the preferred peak wavelength of the charging pulse of 450 nm and, optionally, below the preferred emission maximum of the OSL at 560 nm.

A further preferred wavelength range of a maximum of the read-out spectrum is between 500 nm and 1200 nm. In a further embodiment, the read-out spectrum of the OSP has a local maximum in the orange-red spectral range of 600 nm to 640 nm and falls at higher wavelengths, i.e. no further local maximum occurs. In a further embodiment, the read-out spectrum has a local maximum in the range of 570 nm to 610 nm and a further local maximum in the range of 850 nm to 890 nm. In a further embodiment, the read-out spectrum has a local maximum in the range from 550 nm to 590 nm and drops below a value of 20% of the maximum at a wavelength of 870 nm. In these cases, the local maxima of the read-out spectrum are at longer wavelengths than the preferred peak wavelength of the charging pulse of 450 nm and the preferred emission maximum of the OSL at 560 nm.

The above-specified preferred wavelength ranges of the maximum of the read-out spectrum can correspond to several distinguishable substances, which can be combined, for example, to form a feature system. In particular, it can be provided that several substances are employed in a system, wherein at least two substances have different read-out spectra and/or charging spectra. Several spectral ranges can thus be applied. It has been found that the specified spectra can be realized technically particularly well, for example without having to take special safety precautions. In addition, many of the substances described herein can be efficiently charged and/or read out in the specified spectral ranges.

In a further preferred embodiment, the OSL of the OSP has an emission maximum in a wavelength range of at least 500 nm to at most 600 nm, particularly preferably in a wavelength range of 550 nm to 570 nm. The OSL thus has an emission maximum in the green-yellow range of the electromagnetic spectrum and can thus be cleanly separated both from charging light and from read-out light by technical measures (e.g. filtering). The wavelengths of the emission spectrum can extend both into the blue and the red spectral range.

Additional bands can occur in the emission spectrum of the OSL and/or in the read-out spectrum, which bands can in particular originate from the co-doped ions. However, luminescence and/or excitation of the co-dopant can represent a further energy dissipation channel with reference to the storage of charge carriers, which can have a disadvantageous effect on the intensity of the OSL. Here and in the following, a maximum can be generally a local and/or a global maximum.

A light suitable for reading out the OSP preferably has a peak wavelength in the wavelength range of the read-out spectrum, particularly preferably at the maximum of the read-out spectrum. Here and in the following, a peak wavelength is the wavelength at which the spectral distribution of the light has at least one local maximum, preferably a global maximum.

According to at least one embodiment, the optical storage phosphor has at least one of the following properties:
Decay time of the intrinsic luminescence of at most 100 μs, preferably at most 25 μs;
read-out spectrum with at least two local maxima;
charging spectrum with a maximum at a wavelength of at least 300 nm, preferably of at least 420 nm to at most 500 nm.

The read-out spectrum can have at least two maxima. The read-out spectrum thus has a distinct or pronounced spectral structure. For example, a first maximum lies in a wavelength range of at least 380 nm to at most 420 nm and a second maximum lies in a wavelength range of at least 500 nm to at most 1200 nm.

The OSP can be chargeable with light the wavelength of which is at least in the UV range, preferably with blue light. This makes it possible to avoid employing high-energy X-ray radiation. The OSP is particularly preferably chargeable with light having a peak wavelength of 440 nm to 470 nm.

In comparison to other potentially usable optical storage phosphors, the optical storage phosphors described here can have further properties which are advantageous for application as a security feature in particular.

Thus, the OSP described here preferably exhibits a(n) (measurable) intensive emission, as a result of which already a low concentration of the OSP is sufficient for an authenticity assessment. For example, an OSP according to the invention can be supplied, for which at most a concentration of 1 percent by weight in a paper is required for detecting authenticity on a value document. This remedies the disadvantages, such as, for example, slow decay time and weaker intensity of alternative substances, such as, for example, oxide sulphides of the type $Y_2O_2S$:(Eu,Ti,Mg).

The OSP described here is additionally chemically stable and has, in particular, a high chemical stability and/or resistance to water, bases and acids. Further, the OSP is stable against decomposition by light, for example with a light stability corresponding to a blue wool scale of at least 4. As a result, disadvantages of alternative phosphors such as, for example, alkaline earth sulphides such as (Ca,Sr)S:Eu,Sm, zinc sulphides, such as ZnS:(Cu,Cl), and/or alkaline earth aluminates such as $SrAl_2O_4$:Eu.Dy can be remedied.

With respect to a chemical test (test for stability, for example against moisture, acids, bases and other chemicals such as, for example, solvents, oxidizing agents or detergents), an OSP described here is deemed in particular as chemically stable if the OSL intensity of the applied OSP after the test reaches at least 60%, preferably at least 90%, of the value before the test. In the tests, the OSP is used for marking an object (e.g. document or banknote), for example at a grain size (D99) of 5 μm in paper substrate at a concentration of 0.5 percent by weight. In the acid test, the marked object is brought into contact with an acidic solution (hydrochloric acid) at pH≤0 for 30 minutes. Analogously, in a base test, the marked object is brought into contact with a basic solution (sodium hydroxide solution) at pH≥12 for 30 minutes. In order to test the stability with respect to water, the marked object is placed in deionized water for 24 hours. In a different test, the marked object is exposed to water vapor at 90° C. for 4 hours. In an analogous manner, further tests can be defined. With regard to moisture, acids and bases, the optical storage phosphors described here have a high stability (i.e. they pass the specified tests), whereas other storage phosphors, such as, for example, alkaline earth sulphides, zinc sulphides or also alkaline earth aluminates, are to be regarded as unstable without elaborate protective measures.

The OSP described here is preferably not harmful to health and has no decomposition products which are harmful to health.

The OSP described here preferably has a rapid readability (low memory depth with simultaneously high memory strength). For example, the measured OSL signal is reduced to 50% in less than 2 ms at a continuous read-out pulse (focused laser beam) having a peak wavelength of 638 nm and a nominal light power of 400 mW. This results in particular in advantages in comparison to alkaline earth aluminates such as $SrAl_2O_4$:Eu,Dy. For comparison, this 50% threshold is only reached after a time of more than 7 ms on a typical substance with afterglow (strontium aluminate phosphor, afterglow pigment blue of Kremer Pigmente) under the same conditions.

The OSP described here additionally preferably has a sufficiently low afterglow, in particular in the visible spectral range. Undesired visibility is thus avoided and the measurability of the OSL signal is ensured, since a small superimposition of the OSL signal with the afterglow signal can be ensured.

For technical applicability, it is advantageous to distinguish between the different types of trap states. Trap states close to the conduction band lead to afterglow, while the trap states relevant for OSL are so deep (remote from the conduction band) that they are not significantly emptied by the thermal energy at room temperature. When designing a substance, it is thus possible to influence the type, amount and depth of the trap states in targeted manner by the defect structure, i.e. for example, by deviations from the charge-neutral stoichiometry or co-dopings of further alien ions. In this respect, afterglow and OSL describe phenomena that are different and can be technically addressed in targeted manner.

The exact adjustment of the storage phosphor described here can additionally allow adjusting the relative intensity of the intrinsic luminescence in relation to the optically stimulated luminescence and adjusting the saturation behavior and dynamic behavior of the phosphor with regard to the afterglow, read-out speed and persistence. For this purpose, for example, the cerium doping concentration and co-dopants, the deviations from a stoichiometric formulation and, optionally, the concentration ratio of Al/Ga and/or of Gd/other rare earth elements are adjusted.

In at least one embodiment of the OSP, Ln is lanthanum (La), lutetium (Lu) or yttrium (Y), wherein there additionally applies $y>0$. Preferably $y>0.0005$, particularly preferred is $y>0.001$. Surprisingly, it has been found that by combining Gd with one of the substances La, Lu or Y, the intensity of the OSL is increased by a multiple, partly more than ten times. There applies preferably: $x+y \geq 3.0$; there applies particularly preferably: $x+y>3.0$.

In an embodiment of the OSL there applies: $p>0$, preferably $p>0.0005$ and particularly preferably $p>0.001$. The doping with Ce causes a point defect for forming a luminous center.

According to at least one embodiment of the OSP, Ln is lanthanum (La) or yttrium (Y) and Q is zirconium (Zr) or tin (Sn). Further, there applies: $0.002 \leq p \leq 0.08$; $0.002 \leq q \leq 0.05$; $r=0$; $k=0$; $n \leq 3$; and $t \leq 0.05$. The combinations La and Zr, La and Sn and Y and Sn are preferred. For example, employing La permits an increase in the OSL intensity of the OSP; by employing Zr, for example, an increase in the memory strength of the OSP can be achieved. In addition, an OSP with this composition can have distinct non-commutation. For example, by employing Sn makes it is possible to supply a structured read-out spectrum with readability in the near UV, in particular at wavelengths distinctly smaller than the emission wavelength.

The OSP can thus have the following composition:

$$(Gd_x[La,Y]_y)(Ga_mAl_n)O_{12\pm d}:Ce_p[Zr,Sn]_qT_t \quad (2)$$

Here, and in the following, the angular bracket [X1, X2] means that one of the two elements is present.

According to at least one embodiment of the OSP, Ln is lanthanum (La) or yttrium (Y) and Q is zirconium (Zr). Further there applies: $p=0$; $0.002 \leq q \leq 0.02$; $r=0$; $k=0$, $n \leq 3$; and $t \leq 0.05$. Lanthanum (La) is particularly preferred for Ln. In this embodiment, thus, in particular no cerium is co-doped, as a result of which, for example, an increase in persistence can be achieved.

The OSP can thus have the following composition:

$$(Gd_x[La,Y]_y)(Ga_mAl_n)O_{12\pm d}:Zr_qT_t \quad (3)$$

According to at least one embodiment of the OSP, Ln is lanthanum (La) or yttrium (Y) and Q is zirconium (Zr) or molybdenum (Mo). Further, R is bismuth (Bi). In addition, there applies: $0.005 \leq p \leq 0.08$; $0.002 \leq q \leq 0.05$; $0.002 \leq r \leq 0.05$; $k=0$, $n \leq 3$; and $t \leq 0.05$. The combinations Y and Zr, La and Zr as well as Y and Mo are preferred. For an OSP having such a composition, there is, for example, a distinctly structured read-out spectrum with good readability in the near infrared (NIR).

The OSP can thus have the following composition:

$$Gd_x[La,Y]_y)(Ga_mAl_n)O_{12\pm d}:Ce_p[Zr,Mo]_qBi_rT_t \quad (4)$$

According to at least one embodiment of the OSP, Ln is lanthanum (La) and R is thulium (Tm) or ytterbium (Yb). Further, Q is silver (Ag) and/or zirconium (Zr). In addition, there applies: $0.005 \leq p \leq 0.08$, $0.002 \leq r \leq 0.05$; $k=0$, $n \leq 3$; and $t \leq 0.05$. Preferably $q=0$. Such an OSP exhibits, for example, an increase in the intensity of the optically stimulated luminescence and an increase in the memory depth.

The OSP can thus have the following composition:

$$(Gd_xLa_y)(Ga_mAl_n)O_{12\pm d}:Ce_p[Ag,Zr,(AgZr)]_q[Tm,Yb]_rT_t \quad (5)$$

Alternatively, the combination La and Q=(Ag Zr) and $r=0$ is possible. Such an OSP exhibits, for example, an increase in the intensity of the optically stimulated luminescence and an increase in persistence.

The OSP can thus have the following composition:

$$(Gd_xLa_y)(Ga_mAl_n)O_{12\pm d}:Ce_p(AgZr)_qT_t \quad (6)$$

According to at least one embodiment of the OSP, Ln is lanthanum (La) or yttrium (Y), Q is zirconium (Zr), molybdenum (Mo) or tin (Sn) and R is bismuth (Bi). There applies: $0.1 \leq y \leq 1$; $0.005 \leq p \leq 0.08$; $0.002 \leq q \leq 0.05$; $k=0$; $t \leq 0.05$, $0 \leq n \leq 3.5$; $1.5 \leq m \leq 5$; and $m+n+5q/6=5$; as well as $2.95 \leq x+y+p+r+q/6 \leq 3.1$. The combinations La and Zr with $r=0$, La and Sn with $r=0$ and Y and Sn with $r=0$ are preferred. Further, the combinations Q=Mo and R=Bi ($r \neq 0$) and Q=Zr and R=Bi ($r \neq 0$), in each case with La or Y, are preferred. For example, such a substance has a structured read-out spectrum with an increase in the readability in the near infrared (NIR) and/or a reduction in the memory depth and/or an increase in the memory strength.

The OSP can thus have the following composition:

$$(Gd_x[La,Y]_y)(Ga_mAl_n)O_{12\pm d}:Ce_p[Zr,Mo,Sn]_qBi_rT_t; \quad (7)$$

According to at least one embodiment of the OSP, Q is molybdenum (Mo) or zirconium (Zr), with $0.005 \leq q \leq 0.05$; and $t=0$ and/or $r=0$. Preferably, Ln is lanthanum (La) or yttrium (Y) and R is bismuth (Bi) here.

The OSP described here can be manufactured, for example, as described below. The raw materials (starting substances) are commercially available in each case.

For the manufacture, for example, conventional ceramic sintering methods are generally suitable. In such a method, the powdery starting substances are mixed in the required mass fractions and, optionally, mixed with a suitable fluxing agent (flux) such as, for example, LiF, NaCl, KCl, $Na_2SO_4$ or $K_2SO_4$ or the like, and filled into suitable melting crucibles. The substance is sintered at a sintering temperature which depends on the choice of the fluxing agent. Oxidic starting substances are usually selected; the sintering temperatures are in the range from 800° C. to 1700° C. and the burning durations are several hours.

An alternative method known in the literature is based on the exothermic reaction of dissolved nitrates of the starting substances with a fuel (so-called "combustion synthesis"). For this purpose, the starting substances present as nitrates are dissolved in water. The amounts to be used according to the formulation are transferred, for example, into a beaker and blended with the adjusted amount of fuel, for example carbodihydrazide and/or urea. The batch thus formed is then heated and brought to boil, wherein the water evaporates and a resulting foamy gel is further heated up to an ignition temperature above 400° C. As a result of the ignition, a self-sustaining exothermic reaction is initiated, at the end of which the phosphor is present as a solid nanoparticulate foam. In this manner, serial examinations of substance candidates can be carried out rapidly.

For the further selection steps and/or application steps, the OSP is optionally cleaned from the fluxing agent in one or several washing steps, brought to a suitable grain size by grinding/sifting and further examined and measured as a powder, in processed form in a substrate (for example paper) or in a lacquer.

The procedure for the application of the OSP as a security feature preferably proceeds in an analogous manner, wherein after the grinding/sifting, a mixing of the substance with further feature substances, camouflage substances or/and auxiliary substances can be effected, in particular also in order to obtain multi-functional features, to secure the feature identity against counterfeiting, to adjust the feature for introduction into a carrier medium (for example lacquers or substrates such as paper) and/or to set the quality of the feature substance. These optionally mixed substances are then suitably introduced into the carrier medium, for example a value document.

Further, a method for checking an authenticity feature is stated. The authenticity feature preferably comprises an optical storage phosphor described here and/or the method is preferably carried out on an optical storage phosphor described here. This means that all of the features disclosed for the above-stated optical storage phosphor are also disclosed for the method and vice versa.

Besides supplying the authenticity feature, the method comprises the following steps of:
a) applying an optical charging pulse and/or an optical read-out pulse to the optical storage phosphor;
b) capturing a measured value for an optical emission, in particular for intrinsic or optically stimulated luminescence, of the optical storage phosphor in response to the charging pulse and/or the read-out pulse;
c) authenticity assessment of the security feature, in particular for the positive detection of the optical storage phosphor described here, by means of the measured value.

The charging pulse is preferably part of a charging sequence that includes applying the charging pulse. Further, the read-out pulse is preferably part of a read-out sequence which includes applying the read-out pulse.

Particularly preferably, the method always includes applying an optical read-out pulse. The charging of the OSP can be effected actively by applying an optical charging pulse. Alternatively, it can be exploited that the OSP is charged by the, in particular thermal, background radiation and/or by thermal excitations. Thus, when the charging of the OSP is discussed below, this can mean both active charging with the optical charging pulse and passive charging.

The application of the charging pulse and/or the read-out pulse includes, in particular, an irradiation of the OSP with light, preferably with narrow-band light. The light has, in particular, a peak wavelength which lies in the range of the charging spectrum of the OSP and/or of the read-out spectrum of the OSP, preferably at a maximum of the charging spectrum and/or of the read-out spectrum. Preferably, one or several pulse sequences, i.e. one or several measurement sequences, is/are applied to the OSP, wherein a measurement sequence is composed of a succession of identical or different charging and/or read-out pulses. In particular, a charging pulse or a read-out pulse can be marked by one or several (peak) wavelengths. A charging pulse and/or a read-out pulse is preferably a laser pulse. Besides the peak wavelength, the pulse shape and the pulse duration, also the beam size and/or the power of the charging pulse and/or of the read-out pulse at the position of the OSP can be relevant parameters for the present method.

In step b), the measured value is captured for an optical emission of the OSP. The measured value is preferably a series of measured values, i.e. several measured values. The capture includes in particular the detection of the optical emission. The detection can be effected in a time-resolved manner. For example, a decay curve of the optical emission is measured. The detection can be effected in a spectrally resolved manner; for example a spectrum of the optical emission is measured.

In step c), the authenticity assessment of the OSP is effected. This preferably comprises a comparison of the measured value with a reference value stored in a database. Particularly preferably, the authenticity assessment yields a positive result only if the correct method, in particular the correct method steps and/or the correct succession of these method steps, is/are applied to the correct optical storage phosphor. A potential forger could thus only check whether an OSP replicated by him corresponds to the authentic OSP with the knowledge of the correct method.

A measurement sequence preferably has a multiplicity of charging pulses and/or a multiplicity of read-out pulses. Preferably, different charging pulses and/or read-out pulses each have an identical peak wavelength and/or an identical pulse duration. It is possible that in the measurement sequence first a multiplicity of charging pulses and subsequently a multiplicity of read-out pulses are applied to the OSP. Alternatively, charging pulses and read-out pulses can alternate directly with one another. These different measurement sequences allow different properties of the OSP to be measured.

In a preferred embodiment, at least one first read-out pulse and at least one second read-out pulse, particularly preferably several first and several second read-out pulses, can be applied to the OSP, wherein the first read-out pulse and the second read-out pulse have different peak wavelengths and/or different pulse durations. The first and second read-out pulses can be radiated alternately onto the OSP. Thus, for example, spectral or temporal sensitivity of the OSP or interchangeability can be addressed.

According to at least one embodiment of the method, step b) comprises evaluating the measured value in order to determine a memory property of the storage phosphor. The authenticity assessment in step c) is effected by means of the result of this evaluation.

For determining the memory property, preferably a read-out curve, individual signal intensities, the average value and/or the maximum of the signal intensity, and/or the ratio of signal intensities, in particular taking into account a time profile and/or a sequential arrangement, are evaluated.

For example, in the evaluation, the measured value is compared to a value deposited in a reference table. By the evaluation of the measured value it is possible in particular to determine the type and manner in which the measured value was measured. In the case of known parameters, in particular for the charging pulse and/or the read-out pulse, and/or in the case of known measurement parameters for determining the measured value, it is thereby possible to ascertain which OSP is present and/or in which manner the OSP was charged. Further, it is possible to determine whether the OSP was already read out with a different measurement sequence. The determination of the memory property thus permits determining authenticity with the OSP.

According to at least one embodiment of the method, steps a) and b) comprise the following substeps of:
a1) applying the charging pulse and/or a first read-out pulse to the OSP;
a2) applying a second read-out pulse to the OSP;
b1) capturing a first measured value, which can be the measured value described above, by detecting an optical emission of the OSP in response to the charging pulse and/or the first read-out pulse;
b2) capturing at least one second measured value by detecting an optical emission of the OSP in response to the second read-out pulse.

The second measured value is in this case dependent on the charging pulse and/or the first read-out pulse in step a1). The steps a1), a2), b1) and b2) are preferably carried out in the stated sequential arrangement. Employing two read-out pulses permits, in particular, to determine the interchangeability of the read-out pulses as a memory property of the OSP. If the OSP is non-commutative, a different sequential arrangement of the first and the second read-out pulses leads to a different result for the first measured value and for the second measured value.

According to at least one embodiment of the method, step b) further includes at least one of the following steps of:
determining and evaluating parameters of the charging pulse and/or the read-out pulse;
determining and evaluating a measurement parameter made use of to capture the measured value;
determining and evaluating a background radiation;
determining and evaluating a temporal relationship between the charging pulse and/or the read-out pulse and the capture of the measured value.

The parameters of the charging pulse and/or of the read-out pulse are, in particular, the above-specified properties of the charging and/or read-out pulse, such as wavelength, pulse duration and/or pulse energy, preferably around their peak wavelength. The parameters can further be the number of charging pulses employed and/or of read-out pulses employed. The parameters can further comprise the power and/or the beam diameter of the charging pulse and/or of the read-out pulse at the location of the OSP.

The measurement parameters include, for example, the type and manner of measurement of the measured value. The measurement parameters preferably include information on the detector employed, such as, for example, its spectral resolution (spectral bandwidth), its spatial resolution and/or its temporal resolution (bandwidth). The information about the measurement parameter employed can be advantageous in particular when several signals are emitted by the OSP in response to the read-out pulse and/or the charging pulse.

The background radiation is in particular the background of the measurement. By determining the background radiation or with knowledge thereof, disturbing influences of the ambiance can be removed from the measured value.

The temporal relationship is in particular the temporal succession between the charging pulse and the read-out pulse and/or between successive charging pulses and/or between successive read-out pulses and/or between the charging pulse or the read-out pulse and the detection of the measured value. The temporal relationship is preferably the temporal sequential arrangement employed of the method steps employed in the method. The temporal relationship between the charging pulse and the read-out pulse and/or between successive charging pulses and/or between successive read-out pulses and/or between a charging pulse or read-out pulse and the determination of the measured value can permit an accurate determination of the OSP. By knowing the temporal relationship, for example, it is possible to determine memory properties of the OSP. Further, when the corresponding memory property is known, it is possible to carry out an authenticity assessment method on the basis of the temporal relationship.

For example, two different OSP can have the same or similar emission properties with reference to their wavelength. However, they can have different time constants of the emission. The time constants are caused, for example, by a different memory depth, a different charging speed and/or a different read-out speed. By knowing the temporal relationships between light pulses and measuring processes, such different time constants can be ascertained and taken into account in the evaluation. It is also possible that different time sequences in an otherwise identical measurement sequence can lead to different measured values for different OSP. This can be, for example, a consequence of a different persistence of the two OSP. As a result of a change in the time intervals between charging pulses and/or read-out pulses and/or the detection, the disparity can be ascertained between two OSP that otherwise behave identically.

According to at least one embodiment, the optical storage phosphor has a specific defect structure produced, for example, by the modifications 1 to 8 described herein. The defect structure can manifest itself in the characteristic nature of the storage properties and/or of the optically stimulated luminescence and can be characterized by the memory properties and further measurands which describe OSL.

According to at least one embodiment of the method, the optical storage phosphor has trap centers and luminous centers, wherein charge carriers present in the optical storage phosphor are located at least partially in the trap centers before step a). Further, through the charging pulse, the charge carriers transition at least partially from the luminous centers into the trap centers and/or, through the read-out pulse, transition at least partially from the trap centers into the luminous centers, wherein they relax in radiative manner in the luminous centers.

In this case, the radiative relaxation of the luminous center is preferably measured as the measured value. Further, the time interval between the charging pulse and the read-out pulse and/or the read-out pulse and the detection of the measured value can be determined as a temporal relationship. The temporal relationship then provides, for example, information on the diffusion of the charge carriers between the luminous centers and the trap centers.

It is possible that the charge carriers stored in the OSP are not released to a significant extent from the trap centers through the thermal energy at room temperature. In particular, the average residence time (so-called persistence) of the charge carriers in the trap centers at room temperature can be longer, preferably at least five times longer and particularly preferably at least 100 times longer, than the duration of the authenticity assessment method employed. This can typically be effected in 0.1 to 10 seconds. The persistence is preferably longer than 5 ms, in particular longer than 50 ms.

In one embodiment, the persistence is longer than 750 ms and preferably longer than 5 min.

For example, the charge carriers stored in the trap centers are released only by feeding a suitable amount of energy, namely the read-out pulse. The released charge carriers can then relax at the luminous center while emitting light (so-called radiative relaxing), thereby permitting the storage phosphor to be read out.

According to at least one embodiment of the method, an electrical conductivity of the optical storage phosphor is higher during the application of the charging pulse and/or the read-out pulse in step a) than outside the application.

During the application of the charging pulse (optionally of the charging sequence) and/or of the read-out pulse (optionally of the read-out sequence), the OSP can have a changed light-induced electrical conductivity due to the movement of the charge carriers. The storage phosphor preferably exhibits a maximum electrical conductivity during the charging sequence and/or during the read-out sequence, which is higher, in particular by at least 50% higher, than outside these processes.

According to at least one embodiment of the method, a further measured value is captured before step a) by detecting an optical intensity. This measurement can serve, for example, to determine a background radiation, or it can indicate, via the measurement of a possible intrinsic luminescence, that the OSP is already present in a charged state before the start of the method described here.

Further, an apparatus is stated for carrying out a method for checking authenticity features having an optical storage phosphor. The apparatus is preferably adapted to carry out a method described above, particularly preferably with an OSP described above. This means that all of the features disclosed for the method and for the OSP are also disclosed for the apparatus and vice versa.

The apparatus comprises a light source, which is adapted to apply the at least one charging pulse and/or the at least one read-out pulse to the OSP. The apparatus further comprises a detection device for detecting the optical emission and for capturing the measured value, in particular in step b). The apparatus comprises an evaluation device which is adapted to evaluate the captured measured value and to carry out the authenticity assessment in step c) by means of the evaluation. The apparatus is adapted in particular to output a specific positive detection of the storage phosphor and to carry out the evaluation for authenticity of the security feature, for example of a value document, on the basis of the detection.

During operation, the light source preferably emits light which has a peak wavelength in the wavelength range of the read-out spectrum and/or of the charging spectrum. In particular, the light in the wavelength range of the read-out spectrum can be emitted independently of, in particular temporally and/or spatially separately from, light in the wavelength range of the charging spectrum. For example, the light source includes one or several light-emitting diodes and/or laser diodes, optionally with conversion elements for supplying green, yellow and/or red light.

The apparatus can be adapted, for example, for use in automated teller machines (also often referred to as ATM), a banknote counting apparatus, a banknote checking apparatus and/or a verification unit for identity documents. The apparatus preferably comprises a control unit, such as, for example, a computer, in particular a PC or a micro-controller. The control unit can be adapted to drive the light source in such a way that the desired measurement sequence with the charging pulse and/or the read-out pulse is supplied. The apparatus has, in particular, a receiving unit for receiving value documents, such as, for example, banknotes or passports. The apparatus can operate as an autonomous system independently of a server or can be connected to a server. The server can be supplied locally. Alternatively or additionally, the apparatus can be in communication with or connected to a server which is arranged externally with respect to a local network in which the apparatus is located. The server can assume tasks for evaluating measurement results and for assessing authenticity and/or can supply data for assessing authenticity and/or assessing measurement results. In particular, it can be a server in a cloud environment. The server can supply instructions relating to the succession and parameters of the charging and read-out pulses and of the measuring processes. These instructions can differ depending on the type of value document to be checked.

Further, an authenticity feature and a value document are stated. The authenticity feature and the value document each preferably include an optical storage phosphor described here. Further, the authenticity of the authenticity feature and/or of the value document is preferably checked using a method described here, in particular employing an apparatus described here. This means that all the features disclosed for the OSP, for the method and for the apparatus are also disclosed for the authenticity feature and value document and vice versa.

According to at least one embodiment, the authenticity feature comprises an OSP described herein. The authenticity feature is preferably an additive for a value document, in particular for a carrier material of the value document, and/or a foil element. In particular, the authenticity feature can be applied to the value document in the form of a printing ink, as a pigment and/or as a coating composition, for example as a luminescent substance in a printing ink. Furthermore, the OSP can be introduced into the carrier material during the manufacture of a carrier material of the value document, for example as a pigment during the sheet formation of a security paper.

According to at least one embodiment of the authenticity feature, the OSP present in the authenticity feature has a pronounced spectral structure, in particular with at least two local maxima. The two local maxima are preferably the previously described two maxima of the read-out spectrum. The spectral structure then corresponds in particular to the read-out spectrum.

According to at least one embodiment of the authenticity feature, the OSP present in the authenticity feature has a rapid readability; for example, under focused irradiation with read-out light of a suitable wavelength (i.e. the peak wavelengths lie in the range of the read-out spectrum) at a power of at least 350 mW, the OSL intensity can be brought below 20% of the initial signal after less than 5 ms.

According to at least one embodiment, the value document includes at least one authenticity feature described here, in particular having an optical storage phosphor described here. The value document is preferably a banknote. The value document can further be an identity document, such as, for example, a passport, a ticket, a token and/or another object, such as, for example, a certificate, the authenticity of which is to be affirmed or attested by the authenticity feature. In particular, the value document preferably has a substrate made of paper and/or plastic. The authenticity feature is particularly preferably introduced into the volume of the value document and/or applied to the value document.

BRIEF DESCRIPTION OF THE FIGURES

Preferred further embodiments of the invention are explained in more detail by the following description of the figures and of embodiment examples. There are shown:

FIGS. 2, 3, 4, 5, 6, 7 and 8: embodiment examples of methods according to the invention.

DETAILED DESCRIPTION OF PREFERRED EMBODIMENT EXAMPLES

Figure 1:
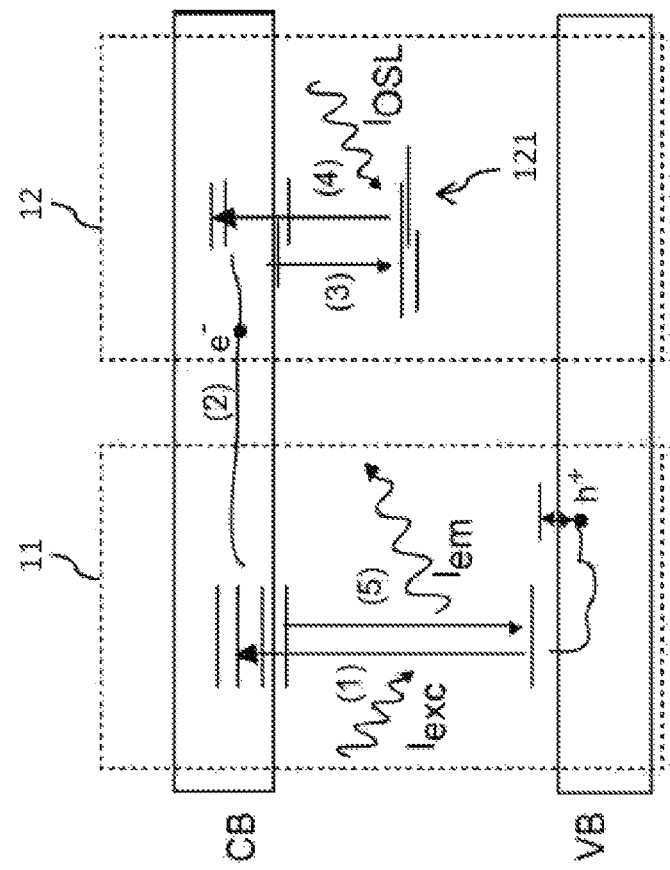
FIG. 1: an embodiment example of an optical storage phosphor described herein and a method for checking an authenticity feature with an OSP according to the invention.

In the following, an optical storage phosphor according to the invention, a method according to the invention, the apparatus according to the invention described here, the authenticity feature according to the invention described here, and the value document according to the invention described here are explained in more detail with reference to preferred embodiment examples. For this purpose, reference is made in particular to associated figures which serve for a better understanding.

In the figures, elements which are identical, of similar type, similar or identically acting are equipped with the same reference numerals. A repeated description of these elements is partly omitted in order to avoid redundancies. The figures and the mutual size ratios of the elements represented in the figures are not to be considered to scale. Rather, individual elements can be represented in an exaggerated size for better representation and/or better understanding.

A general mode of operation, in particular a general embodiment example, of an optical storage phosphor (OSP) described here within the scope of the invention is explained in more detail with reference to the schematic representation of FIG. 1. FIG. 1 reproduces in a simplified manner the processes associated with optically stimulated luminescence (OSL) and the energy scheme of an, in particular inorganic, optical storage phosphor. The optical storage phosphor includes a luminous center 11 and a trap center 12 with trap states 121. $I_{exc}$ denotes light for exciting the luminous center 11, which can also be suitable for charging the OSP. $I_{em}$ denotes light emitted from the luminous center 11, in particular both intrinsic luminescence and optically stimulated luminescence. $I_{OSL}$ denotes the stimulating (reading out) light which can excite a stored charge carrier (indicated by way of example as electrons $e^-$ in FIG. 1) at the trap center into the conduction band CB. A possible involvement of holes $h^+$ from the valence band VB is indicated.

It can be characteristic of the OSP described here that two independent optical systems, in the present embodiment example a luminous center 11 and a trap center 12, couple to one another in a light-driven manner. When the OSP is irradiated with radiation of suitable energy (e.g. wavelength, intensity, duration), at the luminous center 11 (as a rule a metal ion) electrons $e^-$ are lifted into the conduction band CB—or into states on the conduction band CB. This is referred to as process (1) in FIG. 1. The charge carriers $e^-$ diffuse in the conduction band (process (2)) and from there can reach energetically lower trap states 121 (associated with the trap centers 12) and can be stored in these trap states 121 (process (3)). These trap states 121 are at different energetic distances from the conduction band CB. When the trap states 121 are so close to the conduction band CB that the thermal energy at room temperature is already sufficient to empty them, this leads to thermoluminescence at room temperature, which is described as afterglow or persistent luminescence. In the case of deeper trap states 121, the thermal energy at room temperature does not suffice to lift the charge carriers $e^-$ again into the conduction band CB. In these deep trap states 121, the charge carriers $e^-$ are stored in a stable manner. Only by feeding a suitable amount of energy, for example by irradiation with light, are the charge carriers $e^-$ brought into an excited trap state and can be released into the conduction band CB (process (4)). The charge carriers $e^-$ diffuse again in the conduction band CB (process (2)) and recombine at least partially at the luminous center 11 while emitting light (process (5)).

In delimitation against phosphorescence, in which the excited charge carrier $e^-$ is brought into a triplet state in the luminous center 11 itself and relaxes therefrom with a characteristic time constant into another state of the luminous center 11, a reversible, light-driven donor-acceptor reaction takes place in the OSP. In a simplified representation of this reversible, light-driven donor-acceptor reaction, during the storage process, the luminous center emits a charge carrier as donor (as a rule the luminous center 11 is oxidized) and a trap center 12 different therefrom receives the charge carrier $e^-$ as acceptor (the trap center 12 is thus generally deoxidized). The charge carrier $e^-$ is bound at the trap center 12 in a trap state 121. In order to empty the trap state 121, it is required to reverse the preceding process, so that the trap center 12 then emits a charge carrier $e^-$ as donor (thus is oxidized) and the luminous center 11 receives the charge carrier $e^-$ as acceptor (thus is deoxidized). The charge carriers $e^-$ can diffuse through the conduction band CB between the emission and the reception of the charge carriers $e^-$, so that a light-induced, persistent conductivity can also be found in these systems.

In the mechanism described, the trap state 121 is bound to a trap center 12 (such as a vacancy, an alien ion to be doped as a substitution atom, interstitial atoms, or also more complex aggregated defects). It is advantageous if the charge carriers $e^-$ relax into the energetic ground state of the trap center 121 (trap ground state) and thus are not present in a triplet state with a limited lifespan. The trap centers 12 together represent an optical system which is independent of the luminous centers 11. The associated electronic states are thus independent of those of the luminous centers 11.

Figure 2:
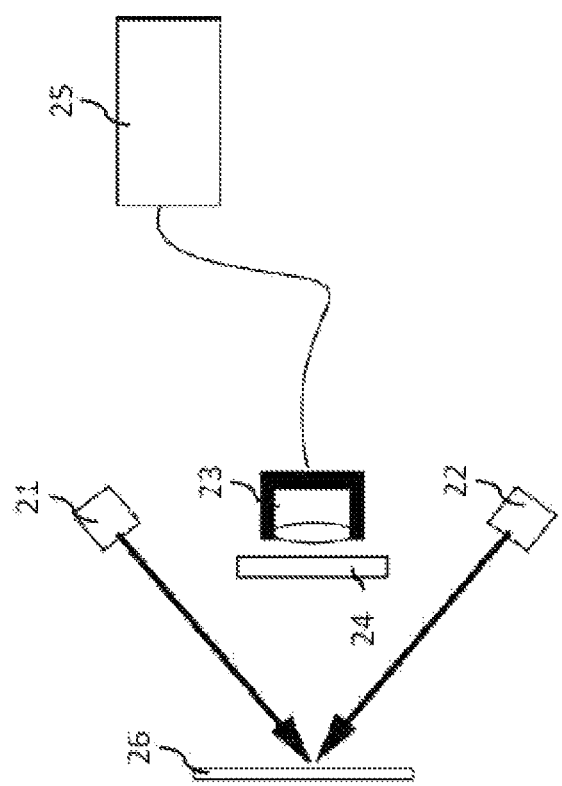

By way of example, a method according to the invention and an apparatus described here for carrying out the method for determining and/or assessing the authenticity of an OSP is explained in more detail with reference to the schematic representation of FIG. 2.

The optical storage phosphor (OSP) 26 is measured with regard to its optical properties by means of the measuring apparatus. The apparatus includes a light source 21 for charging the OSP, a further light source 22 for reading out, a detector 23 with a filter 24 and an apparatus for data recording and evaluation 25.

The light source 21 and/or the light source 22 can be, for example, respectively a light-emitting diode or a laser diode or a spectrally tunable apparatus such as a halogen metal vapor lamp with a settable monochromator. The detector 23 is a photodiode, preferably a Si avalanche photodiode module, with adjusted collector optics. The filter 24 can be a bandpass filter having a passband of 500 nm to 600 nm, preferably having a central wavelength of 550 nm and a full width at half maximum of 40 nm or a central wavelength of 570 nm and a full width at half maximum of 30 nm. As a result, the intensity of the read-out light and the charging light on the detector 23 is reduced, so that the OSL can be measured with higher accuracy. The OSP 26 is applied, for example, to a measuring carrier, is introduced into a paper or is present in powder form in a measuring cuvette.

For determining the read-out spectrum of the OSP 26, the OSP 26 is alternately illuminated in a pulsed manner at the same location by the two light sources 21, 22, and the emitted light is detected. The wavelength of the reading-out light is tuned here, for example by 5 nm from pulse to pulse. Comparability is achieved by suitably setting the exposure duration and the intensity of the charging pulse and of the reading-out pulse. For example, the intensity of the charging pulse can be so great that, after charging, substantially all the trap states are occupied. The allocation of the detector signal to the wavelength of the reading-out light yields the read-out spectrum.

In order to assess the dynamic behavior of the OSP 26, the OSP 26 is irradiated with a charging pulse and subsequently with several identical read-out pulses (see also the diagram of the energy levels of FIG. 1). The wavelength of the light of the read-out pulse is fixed here. The intensity of the OSL is measured for each read-out pulse. The read-out curve can be determined from the allocation of the detector signal to the elapsed time since the start of the read-out, namely since the first read-out pulse. The read-out curve describes the dynamic behavior of the storage phosphor under the selected conditions (duration, intensity and wavelength of the charging and read-out pulses).

Characteristic measures can be determined from the read-out curve for the behavior of the storage phosphor, for example measures for the read-out speed under the selected conditions, for example via the intensity ratio at specific times during the read-out sequence or via suitable, also logarithmic, derivations. These characteristic measures are in particular the measured value described above.

Further embodiment examples, in particular preferred substance compositions, of an OSP described here and the application thereof in a method described here are explained in the following. The substance amounts and weights stated are to be understood in each case within the customary manufacturing tolerances.

The selection of preferred substances is preferably effected by measuring several substances having the compositions described here and a specially matched defect structure with different relevant, but in each case recorded measurement sequences, and selecting those substances with suitable properties. In particular, for the group of selected substances, the measurement result for a measurement sequence differs from the measurement result for a different (optionally also similar) measurement sequence. This corresponds to the specified advantage of the close coupling of detection method and feature substance—corresponding to the memory property of the OSP.

Due to the close linkage of an optimally suitable OSP to the detection method, a serial examination can be helpful for finding suitable formulations of substances. For an embodiment of the authenticity detection for optically stimulated luminescence, a suitable substance is selected by manufacturing a series of substance candidates according to the stoichiometric compositions described herein and examining them for how well the substance candidates can be charged and read out, wherein both temporal and spectral behavior and the achieved intensities of the photoluminescence and the OSL can be assessed. In addition, properties such as fading and/or relative intensities, for example during the first read-out relative to the charging or the ratio of the intensities of the OSL for two or several different wavelengths of the read-out light can also be utilized.

The respective preferred substance compositions were subjected to different measurement sequences in accordance with an embodiment example of a checking method described herein. In particular, the sequences of the embodiment examples 1 to 18 are employed as embodiment examples of a checking method described here.

In all measurements, the illumination spots of the different laser illuminations overlap significantly on the sample (OSP). The emitted light is measured with an avalanche photodiode module with suitable detection optics for imaging the measurement spot onto the detector and filtering (bandpass filtering with 550 nm central wavelength and 44 nm full width at half maximum). The output signal is read out at 2 Msample/s via a fast A/D converter and processed on the PC. Unless explicitly described otherwise, the maximum intensity of the N-th pulse of a read-out sequence measured on the substance s is referred to as $I_N(s)$. If this quantity is normalized to the first pulse of the associated read-out sequence, it is referred to as $I_{N,norm}(s)$.

Unless stated otherwise, the charging and read-out pulses in the ms range are, in good approximation, rectangular pulses, the stated power is the average power over the pulse duration.

In the description of the exemplary substances, the respectively nominally called-for stoichiometry is designated without explicitly mentioning the charge equalization by adjusting the oxygen content (i.e. the quantity d) or possible incorporation of added fluxing agent (i.e. the quantity t). This means that for the manufacture the quantity of raw material to be used can in each case be concluded from the stated molar proportion of the constituent elements (without exactly taking into account the oxygen content).

$1^{st}$ Embodiment Example

Nominally $Gd_{3.04}Al_2Ga_3O_{12}:Ce_{0.005}, Yb_{0.005}$

The first embodiment example of the OSP (substance 1) is manufactured by means of "combustion synthesis". The corresponding nitrates are used as starting substances. First, 6.1386 g $Gd(NO_3)_3.6(H_2O)$ and 4.6413 g $Ga(NO_3)_3.5(H_2O)$ are weighed into an Erlenmeyer flask and dissolved in approximately 150 ml of water. The other substances are pipetted from aqueous stock solutions, so that correspondingly 3.3565 g $Al(NO_3)_3.9(H_2O)$, 0.0097 g $Ce(NO_3)_3.6(H_2O)$, and 0.01 g $Yb(NO_3)_3.5(H_2O)$ are present in solution. A mixture of 1.6121 g of carbohydrazide $CH_6N_4O$ and 4.2317 g of urea $CH_4N_2O$ is added as fuel. The substances are completely dissolved and the solution is further heated on a heating plate in an explosion-proof hood. The substance mixture is finally brought to ignition while complying with the prescribed safety measures. After complete reaction, an yellow powder is present. Finally, the OSP is again post-tempered at 1250° C. for 10 hours. Data of the X-ray structure analysis confirmed the presence of a garnet structure with only slight admixtures of other phases.

$2^{nd}$ Embodiment Example

Nominally $G_{2.54}La_{0.5}Al_2Ga_3O_{12}:Ce_{0.005}, Tm_{0.005}$

The OSP according to the second embodiment example (substance 2) is manufactured by means of "combustion synthesis". The manufacture follows that of substance 1 with respect to the course of action. Used raw materials and substance quantities are: 5.1395 g $Gd(NO_3)_3.6(H_2O)$, 0.9706 g La(NO$_3$)$_3$.6(H$_2$O), 4.6509 g Ga(NO$_3$)$_3$.5(H$_2$O), 3.3635 g Al(NO$_3$)$_3$.9(H$_2$O), 0.01 g Tm(NO$_3$)$_3$.5(H$_2$O), 0.0097 g Ce(NO$_3$)$_3$.6(H$_2$O).

3$^{rd}$ Embodiment Example

Nominally Gd$_{2.52}$La$_{0.5}$Al$_2$Ga$_3$O$_{12}$:Ce$_{0.04}$, Zr$_{0.005}$

The OSP according to the third embodiment example (substance 3) is manufactured with fluxing-agent (flux) supported solid synthesis. For this purpose, the starting substances are carefully mixed with the addition of 10 g of K$_2$SO$_4$ as the flux and are annealed in air in a corundum crucible at 1200° C. for 10 h. The flux is subsequently washed out. Used raw materials and substances quantities are: 0.8704 g La$_2$O$_3$, 4.8809 g G$_2$O$_3$, 1.0896 g Al$_2$O$_3$, 3.0046 g Ga$_2$O$_3$, 0.142 g Ce(SO$_4$)$_2$, 0.0125 g ZrCl$_4$.

The substances 1 to 3 were compared experimentally with regard to their read-out speed. For this purpose, the powders of substances 1 to 3 were ground to a grain size of about 15 µm according to D99, i.e. 99% of the particles are smaller than 15 µm, and were introduced in a proportion of 0.8 percent by weight into a test paper (laboratory standard method for sheet manufacture) and measured.

With a charging pulse, trap states were first occupied in the substances (pulse duration 20 ms). After a further 20 ms waiting time, the read-out pulse (pulse duration 20 ms) starts. The charging pulse is produced by means of a laser diode having a peak wavelength of 450 nm, a power of 350 mW and a spot diameter of 6 mm. The read-out pulse is produced by means of a focused laser diode having a peak wavelength of 638 nm and a power of 450 mW.

The emitted light is measured with an avalanche photo-diode module with upstream focusing optics and optical filtering. The output signal is read out at 2 Msample/s via a fast A/D converter and processed on the PC.

After correction of the signal by the penetrating proportion of the red read-out laser and normalization, the characteristic times are obtained, which are represented in Table 1 below. A comparison is shown of the time durations up to a specific signal value (90%, 50% and 20%) when the substances 1 to 3 are read out under the same conditions. These characteristic times describe how long it takes from the starting time of the read-out until the OSL signal has decayed to a specific relative value. The term OSL signal denotes the signal which is corrected by an offset value and which is obtained when the substance is read out. In a comparative measurement on commercial strontium aluminate phosphor (afterglow pigment blue), the 50% value was only reached after 7.88 ms under these conditions.

TABLE 1

| Substance | OSL signal 100% value | OSL signal 90% value | OSL signal 50% value | OSL signal 20% value |
|---|---|---|---|---|
| Substance 1 | 0.0 ms | 0.16 ms | 1.6 ms | 7.8 ms |
| Substance 2 | 0.0 ms | 0.11 ms | 1.6 ms | 11.0 ms |
| Substance 3 | 0.0 ms | 0.02 ms | 0.3 ms | 2.9 ms |

4$^{th}$ Embodiment Example

Nominally G$_{2.54}$Y$_{0.5}$Al$_2$Ga$_3$O$_{12}$:Ce$_{0.005}$, Bi$_{0.01}$, Mo$_{0.005}$ The OSP according to the fourth embodiment example (substance 4) is manufactured with fluxing-agent (flux) supported solid synthesis. The manufacture follows that of substance 3 with respect to the course of action. Used raw materials and substance quantities are: 0.6236 g Y$_2$O$_3$, 5.0855 g G$_2$O$_3$, 1.1263 g Al$_2$O$_3$, 3.1054 g Ga$_2$O$_3$, 0.0184 g Ce(SO$_4$)$_2$, 0.0066 g MoO$_3$, 0.0322 g Bi$_5$O(OH)$_9$(NO$_3$)$_4$ and 10 g K$_2$SO$_4$ as flux.

Measurements for the Substances 1 to 4

The read-out spectra of the substances 1 and 4 were compared experimentally. For this purpose, the powders of the substances 1 and 4 were in each case added to PMMA cuvettes and measured in a laboratory setup. The substances 1 and 4 were alternately charged with a pulse of a blue-emitting laser diode (peak wavelength 450 nm, power 300 mW, slightly expanded beam with approximately 3 mm diameter, pulse duration 6 ms) and with a tunable laser light source (pulse duration in the range of 15 ns, maximum pulse energy 15 µJ, beam diameter approximately 1 mm). The emitted radiation was measured using an amplified Si detector, the signal was digitized and evaluated on the PC.

For some of the laser wavelengths, the ratio of the OSL signals I, in each case normalized to the maximum, of substance 4 relative to substance 1, i.e. $I_{norm}(4)/I_{norm}(1)$ is stated in Table 2. For the same wavelengths, also the OSL signal normalized to the maximum for the measurement on substance 1 is given in Table 2.

TABLE 2

| Wavelength | $I_{norm}(4)/I_{norm}(1)$ | $I_{norm}(1)$ |
|---|---|---|
| 570 nm | 1.4 | 0.72 |
| 635 nm | 0.9 | 1.00 |
| 685 nm | 0.8 | 0.85 |
| 730 nm | 1.1 | 0.53 |
| 785 nm | 1.5 | 0.29 |
| 808 nm | 2.0 | 0.21 |
| 852 nm | 4.1 | 0.12 |
| 940 nm | 8.0 | 0.04 |
| 1064 nm | 5.8 | 0.01 |

5$^{th}$ Embodiment Example

Nominally G$_{2.52}$La$_{0.5}$Al$_{2.36}$Ga$_{2.5}$O$_{12}$:Ce$_{0.005}$, Bi$_{0.01}$, Mo$_{0.02}$ The OSP according to the fifth embodiment example (substance 5) is manufactured analogously to substance 1 by combustion synthesis. The starting substances used were Gd(NO$_3$)$_3$.6(H$_2$O), La(NO$_3$)$_3$.6(H$_2$O), Ga(NO$_3$)$_3$.5(H$_2$O), Al(NO$_3$)$_3$.9(H$_2$O), Ce(NO$_3$)$_3$.6(H$_2$O) Bi(NO$_3$)3*5H2O, and a standard molybdenum analysis solution for spectroscopy with 1 g/l Mo in each case according to the stated molar amounts.

Measurements for the Substance 5

An embodiment example of a method described here is explained in more detail in connection with FIG. 3. For the measurements shown, the substance 5 was employed, wherein it is also possible to employ other substance compositions with corresponding adjustment of the parameters. The OSP was subjected to authenticity detection according to the method described here.

The entire measurement sequence employed (sequence 1) is constructed as follows:
1) Charging pulse (laser diode, peak wavelength 450 nm, about 450 mW power, defocused to approximately 4 mm illumination diameter, duration 100 µs). The pulse end defines the time zero point for the measurement sequence.
2) 1 ms waiting time.

3) Read-out pulse or read-out sequence: in each case alternating 8 pulses R and R*. Pulse R: laser diode with a peak wavelength of 638 nm, about 600 mW power, focused, pulse duration 4 µs with subsequently 6 µs waiting time before the subsequent pulse R*, Pulse R*: laser diode with a peak wavelength of 852 nm and with about 720 mW power, focused, pulse duration 4 µs with subsequently 6 µs waiting time before the subsequent pulse R).
4) Repeating the measurement sequence with a cycle duration of 2 ms.

For the experiments, the substance 5 was ground to a grain size of about 5 µm according to D99 and introduced in a proportion of 1 percent by weight into a test paper (laboratory standard method for sheet manufacture) and measured.

Figure 3:
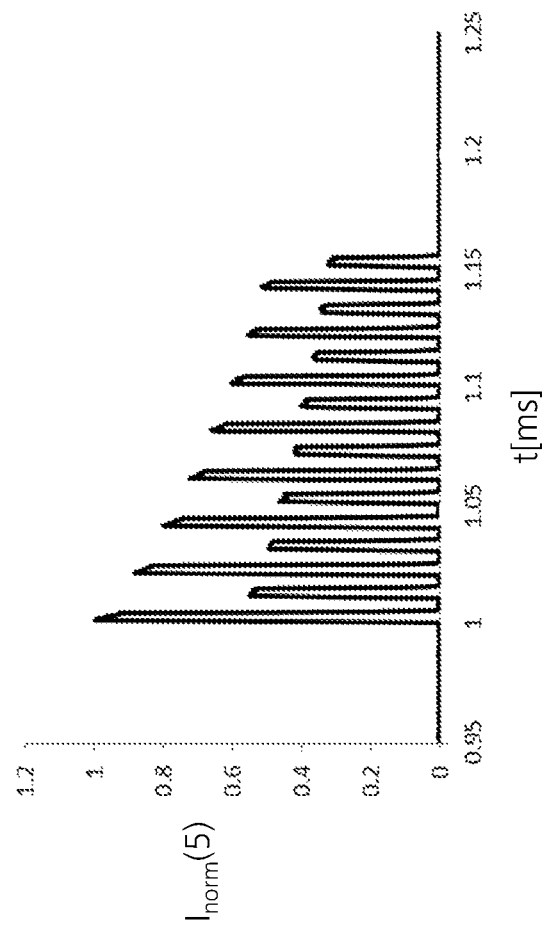

FIG. 3 shows the normalized read-out curve ($I_{norm}$) as a function of time from the measurement with the above sequence 1. The respective signals during the read-out pulses are shown. The OSP employed can be concluded from the course of the read-out curve. In particular, the good readability of substance 5 in red and near infrared (NIR) wavelengths is shown here. The data are preferably further processed, for example in that the signal is averaged for each pulse and the ratio of the signal intensity of the n-th pulse to the signal intensity of the first pulse $S_n/S_1$ is utilized. In addition, for example, the read-out speed can also be described as a percentage pulse-to-pulse decrease in the signal intensity under defined pulse parameters of the read-out pulses. This example also shows the different effect of the read-out pulses R and R*.

6$^{th}$ Embodiment Example

Nominally $La_{0.5}G_{2.54}Al_2Ga_3O_{12}$:$Zr_{0.005}$

The OSP according to the sixth embodiment example (substance 6) is manufactured with fluxing-agent (flux) supported solid synthesis. For this purpose, the starting substances are carefully mixed with the addition of 10 g $Na_2SO_4$ as the flux and annealed in a corundum crucible at 1200° C. for 10 h. Substances used are: 0.8795 g $La_2O_3$, 4.9701 g $Gd_2O_3$, 1.1010 g $Al_2O_3$, 3.0360 g $Ga_2O_3$, 0.01256 g $ZrCl_4$. No cerium was doped in the substance 6.

Measurements for the Substance 6

An embodiment example of a method described here is explained in more detail in connection with FIGS. 4a, 4b and 4c and with FIG. 5. In the method, the substance 6 was subjected to authenticity detection.

The measurement sequence (sequence 2) employed here is constructed as follows:
1) Charging pulse (laser diode with a peak wavelength of 450 nm and with about 350 mW power, duration 20 ms, defocused to approximately 6 mm illumination diameter). The time zero point for this measurement sequence is given by the start of the charging pulse.
2) 65 ms waiting time
3) Eleven pulses G (pulse G: laser diode with a peak wavelength of 638 nm and with about 300 mW power, focused, pulse duration 0.2 ms with subsequently 0.3 ms waiting time before the subsequent pulse G).
4) Repeating the measurement sequence with a cycle duration of 100 ms.

Figure 4:
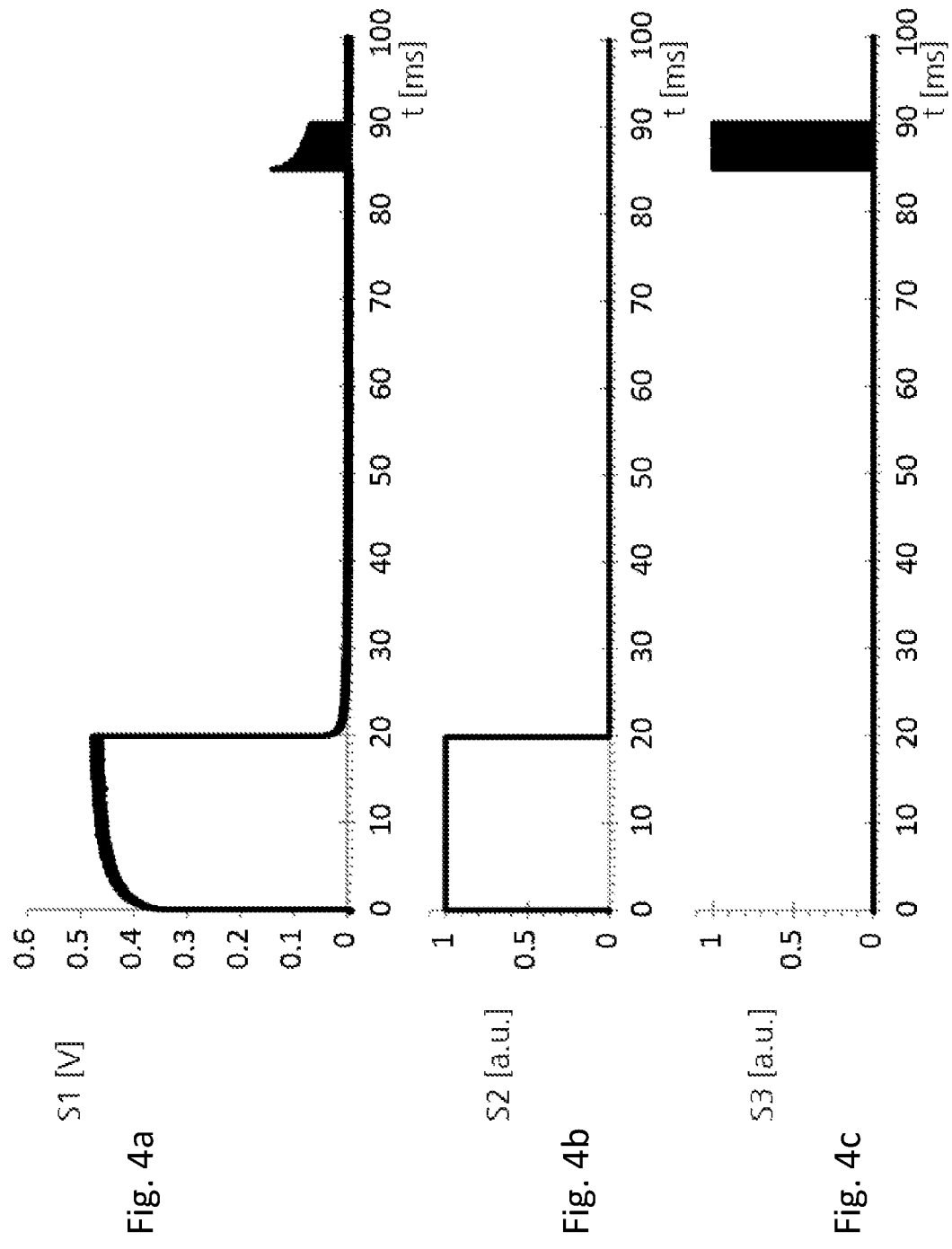

FIG. 4a shows the measured detector signal S1 (in volts) at the OSP over time, FIG. 4b shows the time profile of the trigger signal S2 for the charging (corresponding to the charging pulses), and FIG. 4c shows the time profile of the trigger signal S3 for the read-out (corresponding to the read-out pulses). FIG. 5 represents the read-out sequence in detail, namely in FIG. 5a) the temporal progression of the detector signal S1 (offset-affected read-out curve) and in b) the profile of the associated trigger signal S3 (i.e. the read-out pulses). As the authenticity criterion, there serves for example the shape of the envelope of the read-out curve or the ratio of the signal intensities from the first read-out pulse to the last read-out pulse.

Further Embodiment Examples 7 to 18

Further substances 7 to 18 were manufactured with fluxing-agent (flux) supported solids synthesis. The manufacture follows that of substance 3 with respect to the course of action. The substances are listed with their nominal composition in Table 3. Total batch amounts were in each case 20 g, of which 10 g of fluxing agent $K_2SO_4$ were used. The raw materials from Table 4 were employed as sources for the elements stated in the respective substance composition. The raw materials (cf. Table 4) were added in each case in the amount of element required for the stated substance compositions. Table 4 shows an overview of the raw materials employed for substances 7 to 18.

TABLE 3

| | |
|---|---|
| Substance 7 | $La_{0.5}Gd_{2.54}Al_2Ga_3O_{12}$: $Ce_{0.005}, Yb_{0.005}$ |
| Substance 8 | $YGd_{2.02}Al_2Ga_3O_{12}$: $Ce_{0.04}, Bi_{0.01}, Mo_{0.005}$ |
| Substance 9 | $La_{0.5}Gd_{2.52}Al_{2.5}Ga_{2.5}O_{12}$: $Ce_{0.04}, Bi_{0.01}, Mo_{0.005}$ |
| Substance 10 | $Y_{0.5}Gd_{2.52}Al_{2.5}Ga_{2.5}O_{12}$: $Ce_{0.04}, Bi_{0.01}, Mo_{0.005}$ |
| Substance 11 | $Y_{0.5}Gd_{2.425}Al_{2.475}Ga_{2.5}O_{12}$: $Ce_{0.04}, Bi_{0.03}, Mo_{0.03}$ |
| Substance 12 | $Y_{0.5}Gd_{2.425}Al_{2.475}Ga_{2.5}O_{12}$: $Ce_{0.04}, Bi_{0.03}, Sn_{0.03}$ |
| Substance 13 | $Gd_{2.98}Al_{2.45}Ga_{2.45}O_{12}$: $Ce_{0.01}, Bi_{0.01}, Ge_{0.1}$ |
| Substance 14 | $La_{0.5}Gd_{2.54}Al_2Ga_3O_{12}$: $Ce_{0.02}, Hf_{0.005}$ |
| Substance 15 | $La_{0.5}Gd_{2.481}Al_{1.996}Ga_3O_{12}$: $Ce_{0.02}, Zr_{0.005}$ |
| Substance 16 | $La_{0.5}Gd_{2.4451}Al_{1.975}Ga_3O_{12}$: $Ce_{0.005}, Zr_{0.03}$ |
| Substance 17 | $La_{0.5}Gd_{2.46}Al_{1.92}Ga_3O_{12}$: $Ce_{0.04}, Mo_{0.01}$ |
| Substance 18 | $La_{0.5}Gd_{2.54}Al_2Ga_3O_{12}$: $Ce_{0.005}, Sn_{0.005}$ |

TABLE 4

| Element of the raw material | Formula |
|---|---|
| Al | $Al_2O_3$ |
| Bi | $Bi_5O(OH)_9(NO_3)_4$ |
| Ce | $Ce(SO_4)_2$ |
| Ga | $Ga_2O_3$ |
| Gd | $Gd_2O_3$ |
| Ge | $GeO_2$ |
| Hf | $HfO_2$ |
| La | $La_2O_3$ |
| Mo | $MoO_3$ |
| Nb | $Nb_2O_5$ |
| Sn | $SnO_2$ |
| Y | $Y_2O_3$ |
| Yb | $Yb_2O_3$ |
| Zr | $ZrCl_4$ |

Measurements for the Substances 7 to 13

For the above substances 7 to 13, different measurements were carried out in each case according to an embodiment example of a checking method described here, in order to describe the effect of changes in the matrix of the OSP, of doping substances and/or the concentrations thereof on the properties of the OSP.

For this purpose, the respective substances were measured with the following measurement sequence (sequence 3):
1) Charging pulse (laser diode with a peak wavelength of 450 nm and with about 400 mW power, duration 20 ms, spot approximately 3 mm diameter). The time zero point corresponds to the start of the charging pulse.
2) 23.6 ms waiting time after the end of the charging pulse
3) Six repetitions of a pulse pair (ST):
   Pulse S: laser diode with a peak wavelength of 638 nm (red) and with about 450 mW power, focused, pulse duration 0.2 ms with subsequently 0.2 ms waiting time before the subsequent pulse T
   Pulse T: laser diode with a peak wavelength of 915 nm (NIR) and with about 500 mW power, focused, pulse duration 0.2 ms with subsequently 0.2 ms waiting time.
4) Repeating the measurement sequence with a cycle duration of 50 ms.

Table 5 lists suitable measurands and their definitions. $I_N$ denotes the maximum signal intensity of the N-th read-out pulse of the measurement sequence. The measurands listed here illustrate, by way of example, how the data of a measurement sequence can be evaluated and are in no way to be understood as a complete enumeration of a data evaluation. Further measurands can be defined and alternative evaluation methods (such as direct comparison to target data, adjustments, normalization to intrinsic signals) can be effected. Table 6 gives an overview of the measurands defined in Table 5 for the substances 7 to 13.

speeds. These substances exhibit, by way of example, differences in their spectral sensitivity and in their read-out speeds.

Measurements for the Substances 7 and 14 to 17

For the above substances 7 and 14 to 17, further measurements were carried out according to an embodiment example of a checking method described here, in order to describe the effect of changes in the matrix of the OSP, of doping substances and/or the concentrations thereof on the properties of the OSP.

For this purpose, the respective substances were measured with the following measurement sequence (sequence 4):
1) Charging pulse (laser diode with a peak wavelength of 450 nm and with about 350 mW power, duration 20 ms, spot approximately 6 mm diameter). The time zero point corresponds to the start of the charging pulse.
2) 23.6 ms waiting time after the end of the charging pulse.
3) Twelve pulses U: laser diode with a peak wavelength of 638 nm with about 400 mW power, focused, pulse duration 0.2 ms) with subsequently 0.2 ms waiting time before the subsequent pulse
4) Repeating the measurement sequence with a cycle duration of 50 ms.

Table 7 lists suitable measurands and their definitions. $I_N$ denotes the maximum signal intensity of the N-th read-out pulse of the measurement sequence. Table 8 gives an overview of the measurands defined in Table 7 for the substances 7 (as reference) and 14 to 17.

TABLE 5

| Measurand | Description | Measurement |
| --- | --- | --- |
| $I_{max}$(Seq 3) | Maximum OSL signal | Sequence 3 |
| SpeedNIR(Seq 3) | Read-out speed at NIR read-out under measuring sequence 3 | As the measure there is: $\mathrm{SpeedNIR(Seq\ 3)} = \frac{I4 - I2}{I12 - I10}$ |
| SpeedRED(Seq 3) | Read-out speed at red read-out under measuring sequence 3 | As the measure there is: $\mathrm{SpeedRED(Seq\ 3)} = \frac{I3 - I1}{I11 - I9}$ |
| Speed(Seq3) | Read-out speed under measurement sequence 3 | As the measure there is: $\mathrm{Speed(Seq\ 3)} = \frac{I2 - I1}{I12 - I11}$ |
| Q | Spectral sensitivity as signal ratio of the first (red) to the second (NIR) pulse of the measuring sequence 3 | As the measure there is: $Q = \frac{I_1(\mathrm{Seq\ 3})}{I_2(\mathrm{Seq\ 3})}$ |

TABLE 7

| Measurand | Description | Measurement |
| --- | --- | --- |
| $I_{max}$(Seq 4) | Maximum OSL signal (random units) under focused read-out light at 638 nm | Measuring sequence 4, per pulse determination of the maximum value (smoothed from 20 individual values around the maximum) |
| v(Seq 4) | Read-out speed under measurement sequence 4 | Measurement sequence 4, as the measure there is: $v(\mathrm{Seq\ 4}) = \frac{1}{I_1} \frac{I_1 + I_{11} - 2I_6}{25} * 100$ |
| Speed(Seq 4) | Alternative description of the read-out speed under measurement sequence 4 | Measurement sequence 4, as the measure there is: $\mathrm{Speed(Seq\ 4)} = \frac{I3 - I1}{I12 - I10}$ |

TABLE 6

| | Substance 7 | Substance 8 | Substance 9 | Substance 10 | Substance 11 | Substance 12 | Substance 13 |
| --- | --- | --- | --- | --- | --- | --- | --- |
| $I_{max}$(Seq 3) [V] | 3.50 | 1.84 | 1.63 | 1.83 | 0.63 | 0.16 | 1.18 |
| SpeedNIR(Seq 3) | 1.19 | 1.87 | 2.27 | 2.38 | 1.81 | 1.81 | 1.33 |
| SpeedRED(Seq 3) | 3.70 | 2.45 | 2.65 | 2.85 | 2.15 | 1.99 | 1.81 |
| Speed(Seq3) | 1.82 | 2.29 | 2.24 | 2.47 | 1.70 | 1.25 | 1.38 |
| Q | 8.53 | 1.57 | 1.56 | 1.63 | 1.66 | 2.60 | 1.89 |

Besides substance 7 (which has a high OSL signal $I_{max}$ but hardly reacts to the NIR components), also the other substances appear interesting for the applications, since they can also be significantly read out with the NIR pulses (visible in the parameter Q) and at the same time have distinguishable

TABLE 8

| Substance | $I_{max}$(Seq 4) | v(Seq 4) | Speed(Seq 4) |
| --- | --- | --- | --- |
| Substance 7 | 0.67 | 2.00 | 5.11 |
| Substance 14 | 0.34 | 2.50 | 6.74 |

TABLE 8-continued

| Substance | $I_{max}$(Seq 4) | v(Seq 4) | Speed(Seq 4) |
|---|---|---|---|
| Substance 15 | 3.46 | 3.05 | 18.26 |
| Substance 16 | 0.82 | 1.44 | 7.22 |
| Substance 17 | 0.19 | 1.96 | 3.89 |

Figure 6:
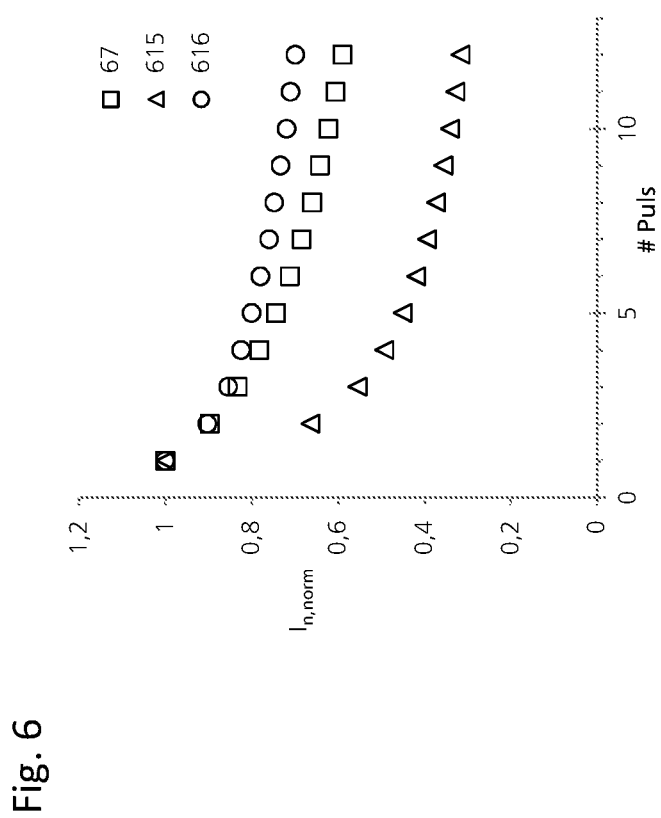

In FIG. 6, normalized read-out curves for the substance 7 (reference numeral 67), the substance 15 (reference numeral 615) and the substance 16 (reference numeral 616) are represented, wherein the maximum signal $I_{N,norm}$ of the pulse N is plotted against the pulse number N for each read-out pulse of the sequence 4. The curves are each normalized to the signal of the first pulse. This example illustrates the effect of the composition of the OSP on its properties, as becomes visible here by way of example in the measured values (Tables 7 and 8) and/or also in the direct comparison of the read-out curve (FIG. 6). In particular, it becomes distinct from the comparison of the read-out curve for substance 15 (reference numeral 615) and 16 (reference numeral 616) that small changes in the composition substantially change the defect structure of the substance, which manifests itself in the distinct change in characteristic measurands (for example as in Tables 7 and 8) and/or read-out curves (such as, for example, in FIG. 6): the read-out speeds and the read-out curves of the individual substances differ significantly from one another.

Measurements for the Substances 3, 7, 13 and 16

For the substances 3, 7 and 13 and for substance 16, further measurements were carried out according to an embodiment example of a checking method described here, in order to ascertain properties of the substances which exemplarily compare the readability in the near UV range.

The measurements were first carried out using the following measurement sequence (sequence 5):
1) Charging pulse (laser diode with a peak wavelength of 450 nm with about 300 mW power, duration 20 ms, spot approximately 3 mm diameter). The time zero point corresponds to the start of the charging pulse.
2) 80.252 ms waiting time after the end of the charging pulse.
3) Twelve pulses Z: laser diode with a peak wavelength of 398 nm with about 280 mW power, focused, pulse duration 0.2 ms with subsequently 0.2 ms waiting time before the subsequent pulse.
4) Repeating the measurement sequence with a cycle duration of 100 ms.

In addition, the following measurement sequence (sequence 6) was then utilized:
1) Charging pulse (laser diode with a peak wavelength of 450 nm with about 300 mW power, duration 20 ms, spot approximately 3 mm diameter). The time zero point corresponds to the start of the charging pulse.
2) 43.841 ms waiting time after the end of the charging pulse.
3) 6 repetitions of a pulse pair (SZ):
   pulse S: laser diode with a peak wavelength of 638 nm with about 450 mW power, focused, pulse duration 0.2 ms with subsequently 0.2 ms waiting time before the subsequent pulse Z.
   Pulse Z: laser diode with a peak wavelength of 398 nm with about 280 mW power, focused, pulse duration 0.2 ms with subsequently 0.2 ms waiting time before the subsequent pulse S.
4) Repeating the measurement sequence with a cycle duration of 50 ms.

Table 9 lists suitable measurands and their definitions for sequences 5 and 6. $I_N$ denotes the maximum signal intensity of the N-th read-out pulse of the respective measurement sequence. Table 10 includes a list with the measurands defined in Table 9 for the substances 3, 7 and 13 and 16.

TABLE 9

| Measurand | Description | Measurement |
|---|---|---|
| Speed(Seq 5) | Alternative description of the read-out speed under measurement sequence 5 | Measurement sequence 5, as the measure there is: $\text{Speed(Seq 5)} = \frac{I3 - I1}{I12 - I10}$ |
| $I_{rel}$(Seq 6) | Relative signal intensity of the first pulse at 638 nm read-out for the intensity of the first pulse at 405 nm read-out | Measurement sequence 6, as the measure there is: $I_{rel} = \text{(Seq 6)} = \frac{I_1}{I_2}$ |

TABLE 10

| Substance | Speed(Seq5) | $I_{rel}$(Seq 6) |
|---|---|---|
| Substance 3 | 1.9 | 0.46 |
| Substance 7 | 22.8 | 0.73 |
| Substance 13 | 12.1 | 0.60 |
| Substance 16 | not determined | 1.41 |

By way of example, these substances exhibit different spectral sensitivities which can be found not only in intensity ratios but also in read-out speeds, as follows from the values in Table 10.

Measurements for the Substance 18

Substance 18 shows an efficient readability, above all at 398 nm, while it is hardly readable in the red and NIR spectral range. For the detection, the substance 18 was subjected to the measurement sequence 6 and to a further measurement sequence 7, and the data were evaluated.

The measurement sequence (sequence 7) employed is as follows:
1) Charging pulse (laser diode with a peak wavelength of 450 nm with about 300 mW power, duration 20 ms, spot approximately 3 mm diameter). The time zero point corresponds to the start of the charging pulse.
2) 43.841 ms waiting time after the end of the charging pulse.
3) 6 repetitions of a pulse pair (TZ):
   Pulse T: laser diode with a peak wavelength of 915 nm with about 500 mW power, focused, pulse duration 0.2 ms with subsequently 0.2 ms waiting time before the subsequent pulse Z
   Pulse Z: laser diode with a peak wavelength of 398 nm with about 280 mW power, focused, pulse duration 0.2 ms with subsequently 0.2 ms waiting time before the subsequent pulse T.
4) Repeating the measurement sequence with a cycle duration of 50 ms.

Figure 7:
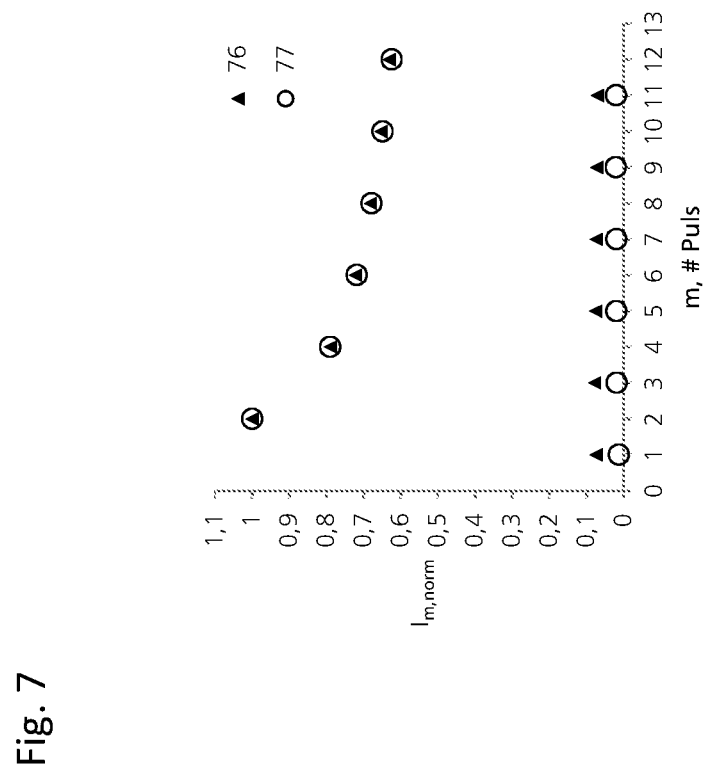

The comparison of the measurements of the substance 18 for the sequence 6 (reference numeral 76) and the sequence 7 (reference numeral 77) is represented in FIG. 7. FIG. 7 shows a sequence of the respective maximum normalized signal $I_{m,norm}$ of the m-th read-out pulse as a function of the number m of the read-out pulse. Even pulse numbers (upper measured values) correspond in each case to pulses of the type Z, thus a wavelength of the read-out light of 398 nm, while odd pulse numbers (lower measured values with an intensity of below 0.1) correspond to a wavelength of the read-out light of 638 nm (type S, measurement sequence 6) or 915 nm (type T, measurement sequence 7). Thus, the pulse type Z is able to read out the substance 18, while the signals remain below 0.1 for the pulse type S and T. It can be seen that the substance 18 can be read out above all at a wavelength of 398 nm, i.e. at a wavelength shorter than the emission wavelength and even shorter than the preferred wavelength of the charging light of about 450 nm.

Further Embodiment Examples

Substances 19, 20 and 21

By means of the further embodiment examples of the substances 19, 20 and 21, the influence of small changes in the chemical composition of the garnet matrix on the properties of the OSP is to be examined. Total batch amounts were in each case 20 g, of which 10 g of fluxing agent $K_2SO_4$ were used. The raw materials from Table 4 were employed as sources for the elements stated in the respective substance composition. The raw materials were in each case added in the quantity of element required for the stated substance compositions.

The substances 19, 20 and 21 were manufactured with fluxing-agent (flux) supported solids synthesis. The manufacture follows that of substance 3 with respect to the course of action. The nominal composition of the substances is:
Substance 19: $G_{2.995}Al_2Ga_{2.993}O_{12}{:}Ce_{0.005}, Zr_{0.005}$;
Substance 20: $La_{0.5}Gd_{2.495}Al_2Ga_{2.993}O_{12}{:}Ce_{0.005}, Zr_{0.005}$;
Substance 21: $La_{0.5}Gd_{2.53}Al_2Ga_{2.993}O_{12}{:}Ce_{0.005}, Zr_{0.005}$.
Substance 19 includes no lanthanum, substance 20 is an approximately stoichiometric formulation, whereas substance 21 has a distinct excess of rare earth elements (here: Gd).

These three substances are compared with a measurement sequence according to an embodiment example of a method described here. The measurement sequence (sequence 8) is constructed as follows:
1) Charging pulse (laser diode with a peak wavelength of 450 nm with about 350 mW power, duration 3.5 ms, spot approximately 5 mm diameter). The time zero point corresponds to the start of the charging pulse.
2) 1.52 ms waiting time after the end of the charging pulse.
3) Twelve pulses V (pulse V: laser diode with a peak wavelength 638 nm with about 1600 mW power, illuminated rectangular spot on the sample approx. 1 mm×4 mm, pulse duration 0.2 ms with subsequently 0.2 ms waiting time before the subsequent pulse V). The time zero point for this read-out sequence is given by the start of the first read-out pulse.
4) Repeating the measurement sequence with a cycle duration of 10 ms.

Figure 8:
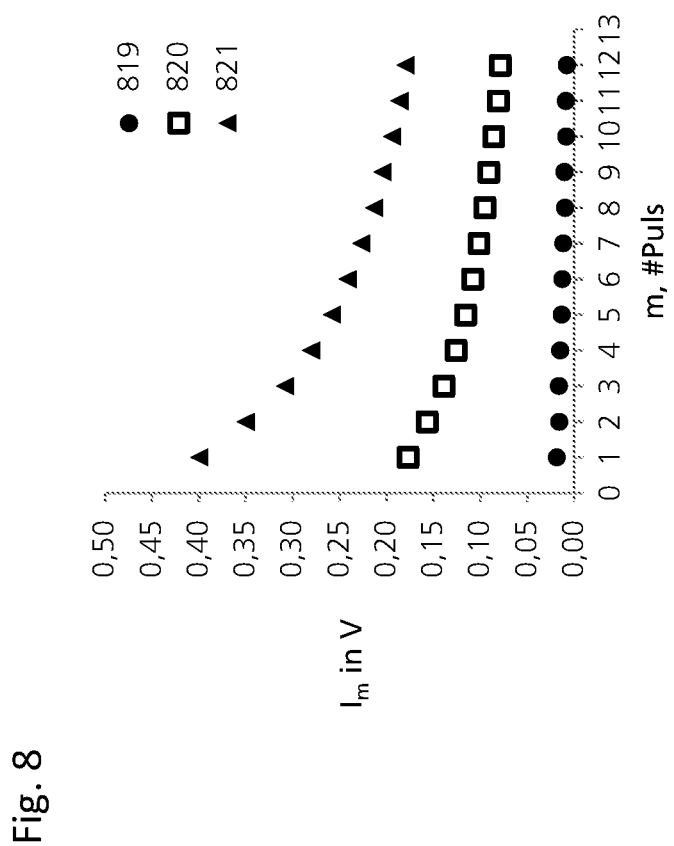

For the three substances the maximum signal values $I_m$ for each read-out pulse m are contrasted as read-out curves in FIG. 8.

The effect of the lanthanum co-doping is seen by comparing the signals for the respective $1^{st}$ read-out pulse. Substance 19 (reference numeral 819) hardly shows an OSL signal (here 33 mV, wherein about 15 mV already originate from the residual permeability of the filters employed), while the maximum signal under the same conditions for substance 20 (reference numeral 820) amounts to about 190 mV. No trustworthy read-out speed can be stated for the substance 19, since the signal has hardly any variation. In the case of substance 20, the signal of 100% ($1^{st}$ read-out pulse) drops to 49% percent ($12^{th}$ pulse) under the measurement sequence 8. In the case of substance 21 (reference numeral 821), the excess of rare earth elements (here: Gd) leads to a further increased initial intensity of the OSL of 415 mV under sequence 8. At the same time, the signal between two read-out pulses (i.e. without irradiation with light) for substance 21, normalized to the respective maximum read-out pulse, amounts to only about 60% of that of substance 20 (not shown), which indicates reduced afterglow.

By changes in the defect structure, which like here are caused, for example, by a small change in the composition of the host lattice (introduction of La) and/or by a small deviation from the nominal charge neutrality (excess Gd), it is possible to achieve distinctly measurable differences in the properties, for example memory strength and read-out speed here. At the same time, undesired properties such as afterglow can be suppressed. This example emphasizes that the defect structure is part of the substance.

The description with reference to the embodiment examples does not imply that the invention is limited to these. Rather, the invention comprises each novel feature and any combination of features, which in particular includes any combination of features in the claims, even if this feature or this combination itself is not explicitly stated in the claims or embodiment examples.

The invention claimed is:

1. An authenticity feature comprising an optical storage phosphor based on a garnet structure, the optical storage phosphor having the following composition:

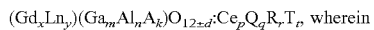

$(Gd_xLn_y)(Ga_mAl_nA_k)O_{12\pm d}{:}Ce_pQ_qR_rT_t$, wherein

Ln comprises at least one of the following elements: La, Lu, Y;
A comprises at least one of the following elements: Ge, Sc, Si;
Q comprises at least one of the following elements: Ag, Cr, Hf, Mo, Nb, Sn, Ta, Ti, W, Zr;
R comprises at least one of the following elements: Bi, Pr, Nd, Sm, Eu, Tb, Dy, Ho, Er, Tm, Yb;
T comprises at least one of the following elements: B, F, Li, Mg, K, Na;
$1.0 \leq x \leq 3.2$ and $0 \leq y \leq 1.65$;
$0.5 \leq m \leq 5.2$, $0 \leq n \leq 4.7$ and $0 \leq k \leq 0.5$, wherein $4.8 \leq m+n+k \leq 5.2$;
$0 \leq p \leq 0.1$, wherein p=0 only for Q=Zr;
$0 \leq q \leq 0.05$;
$0 \leq r \leq 0.05$;
$0 \leq t \leq 0.1$;
$0 \leq d \leq 0.5$;
$p+q>0.002$;
$q+r>0.002$; and
$2.8 \leq x+y+p+r \leq 3.2$.

2. The authenticity feature according to claim 1, wherein $0<y$.

3. The authenticity feature according to claim 1, wherein $0<q$, and/or $0<r$.

4. The authenticity feature according to claim 3, wherein Ce, Q and/or R form two independent optical systems which can be transferred into their initial state by at least two-stage external energy input.

5. The authenticity feature according to claim 1,
wherein the optical storage phosphor is configured to be readable by light irradiation;
wherein a read-out spectrum of the optical storage phosphor has a maximum in a wavelength range of at least 360 nm to at most 1200 nm; and
wherein the optically stimulated luminescence of the optical storage phosphor has an emission maximum in the wavelength range from 500 nm to 600 nm.

6. The authenticity feature according to claim 1, wherein the optical storage phosphor has at least one of the following properties:
- decay time of an intrinsic luminescence of the optical storage phosphor of at most 100 μs;
- read-out spectrum with at least two maxima;
- charging spectrum with a maximum at a wavelength of at least 300 nm.

7. The authenticity feature according to claim 1, wherein Ln is lanthanum (La) or yttrium (Y) and
Q is zirconium (Zr) or tin (Sn), with:
$0.002 \le p \le 0.08$;
$0.002 \le q \le 0.05$;
$r=0$;
$k=0$, $n \le 3$;
and $t \le 0.05$.

8. The authenticity feature according to claim 1, wherein Ln is lanthanum (La) or yttrium (Y) and
Q is zirconium (Zr), with
$p=0$;
$0.002 \le q \le 0.02$;
$r=0$;
$k=0$, $n \le 3$;
and $t \le 0.05$.

9. The authenticity feature according to claim 1, wherein Ln is lanthanum (La) or yttrium (Y) and
Q is zirconium (Zr) or molybdenum (Mo),
R is bismuth (Bi), with
$0.005 \le p \le 0.08$;
$0.002 \le q \le 0.05$;
$0.002 \le r \le 0.05$;
$k=0$, $n \le 3$;
and $t \le 0.05$.

10. The authenticity feature according to claim 1, wherein Ln is lanthanum (La);
R is thulium (Tm) or ytterbium (Yb) and
Q is silver (Ag) and/or zirconium (Zr), with
$0.005 \le p \le 0.08$
$0.002 \le r \le 0.05$;
$k=0$, $n \le 3$;
and $t \le 0.05$.

11. The authenticity feature according to claim 1, wherein Ln is lanthanum (La) or yttrium (Y),
Q is zirconium (Zr), molybdenum (Mo) or tin (Sn) and
R is bismuth (Bi), wherein
$0.1 \le y \le 1$;
$0.005 \le p \le 0.08$;
$0.002 \le q \le 0.05$;
$k=0$;
$t \le 0.05$;
$0 \le n \le 3.5$; $1.5 \le m \le 5$;
and $m+n+5q/6=5$
as well as $2.95 \le x+y+p+r+q/6 \le 3.1$.

12. The authenticity feature according to claim 11, wherein
Q is molybdenum (Mo) or zirconium (Zr), wherein
$0.05 \le q \le 0.05$;
and $t=0$ and/or $r=0$.

13. A method for checking an authenticity feature according to claim 1, comprising the following steps of:
- applying an optical charging pulse and/or an optical read-out pulse to the optical storage phosphor;
- capturing a measured value for an optical emission of the optical storage phosphor in response to the charging pulse and/or the read-out pulse;
- authenticity assessment of the security feature by means of the measured value.

14. The method according to claim 13, wherein step b) further comprises evaluating the measured value in order to determine a memory property of the storage phosphor, and wherein the authenticity assessment in step c) is effected by means of the result of this evaluation.

15. The method according to claim 13, wherein step b) further includes at least one of the following steps of:
- determining and evaluating a parameter of the charging pulse and/or the read-out pulse;
- determining and evaluating a measurement parameter made use of to capture the measured value;
- determining and evaluating a background radiation;
- determining and evaluating a temporal relationship between the charging pulse and/or the read-out pulse and the capture of the measured value.

16. The method according to claim 13, wherein the optical storage phosphor has trap centers and luminous centers, wherein
- charge carriers present in the optical storage phosphor are located at least partially in the trap centers before step a) and
- the charge carriers transition at least partially from the luminous centers into the trap centers due to the charging pulse and/or transition at least partially from the trap centers into the luminous centers due to the read-out pulse and relax radiatively in the luminous centers.

17. The method according to claim 13, wherein an electrical conductivity of the optical storage phosphor during the application of the charging pulse and/or the read-out pulse in step a) is higher than outside the application.

18. The method according to claim 13, wherein before step a) a further measured value is captured by detecting an optical intensity.

19. An apparatus for carrying out a method according to claim 13, comprising
- a light source, which is adapted to apply the at least one charging pulse and/or the at least one read-out pulse to the optical storage phosphor in step a),
- a detection device for detecting the optical emission and for capturing the measured value in step b), and
- an evaluation device which is adapted to evaluate the captured measured value and, by means of the evaluation, to carry out the authenticity assessment on the basis of a specific positive detection of the storage phosphor in step c).

20. The authenticity feature according to claim 1, wherein the optical storage phosphor has a read-out spectrum with a pronounced spectral structure, with at least two local maxima.

21. A value document having at least one authenticity feature according to claim 1.

* * * * *